United States Patent [19]
Kim et al.

[11] Patent Number: 5,498,940
[45] Date of Patent: Mar. 12, 1996

[54] METHODS AND APPARATUS FOR MAINTAINING A CONSTANT TENSION ON AN ELECTRICAL CORD OF A ROBOT

[75] Inventors: Ji-Hyun Kim, Seoul; Suk-Jin Han, Suwon; Jae-Bong Lee, Seoul, all of Rep. of Korea

[73] Assignee: Samsung Electronics Co., Ltd., Suwon, Rep. of Korea

[21] Appl. No.: 175,536

[22] Filed: Dec. 30, 1993

[30] Foreign Application Priority Data

Dec. 30, 1992 [KR] Rep. of Korea ............... 92-26640
Feb. 18, 1993 [KR] Rep. of Korea ............... 93-2233

[51] Int. Cl.⁶ ............................................. B65H 59/38
[52] U.S. Cl. .................... 318/6; 318/282; 191/122 A; 242/413; 242/420.5
[58] Field of Search .................... 318/280, 286, 318/287, 291, 6; 242/371–377, 412–413, 413.1, 412.3, 420.5, 570; 191/12 R, 12.2 R, 12.2 A

[56] References Cited

U.S. PATENT DOCUMENTS

| | | | |
|---|---|---|---|
| 3,983,977 | 10/1976 | Crabb | 242/96 |
| 4,136,840 | 1/1979 | Bates | 242/86.5 R |
| 4,721,833 | 1/1988 | Dubay | 242/54 R |
| 4,842,108 | 6/1989 | Anderson et al. | 191/12.2 A |

*Primary Examiner*—David S. Martin
*Attorney, Agent, or Firm*—Burns, Doane, Swecker & Mathis

[57] ABSTRACT

A constant tension is maintained on cord of a robot by determining whether the cord is being extracted or retracted and the extent of such extraction or retraction, and increasing or decreasing a spring force applied to the cord by an amount suitable for maintaining a constant tension on the cord.

10 Claims, 14 Drawing Sheets

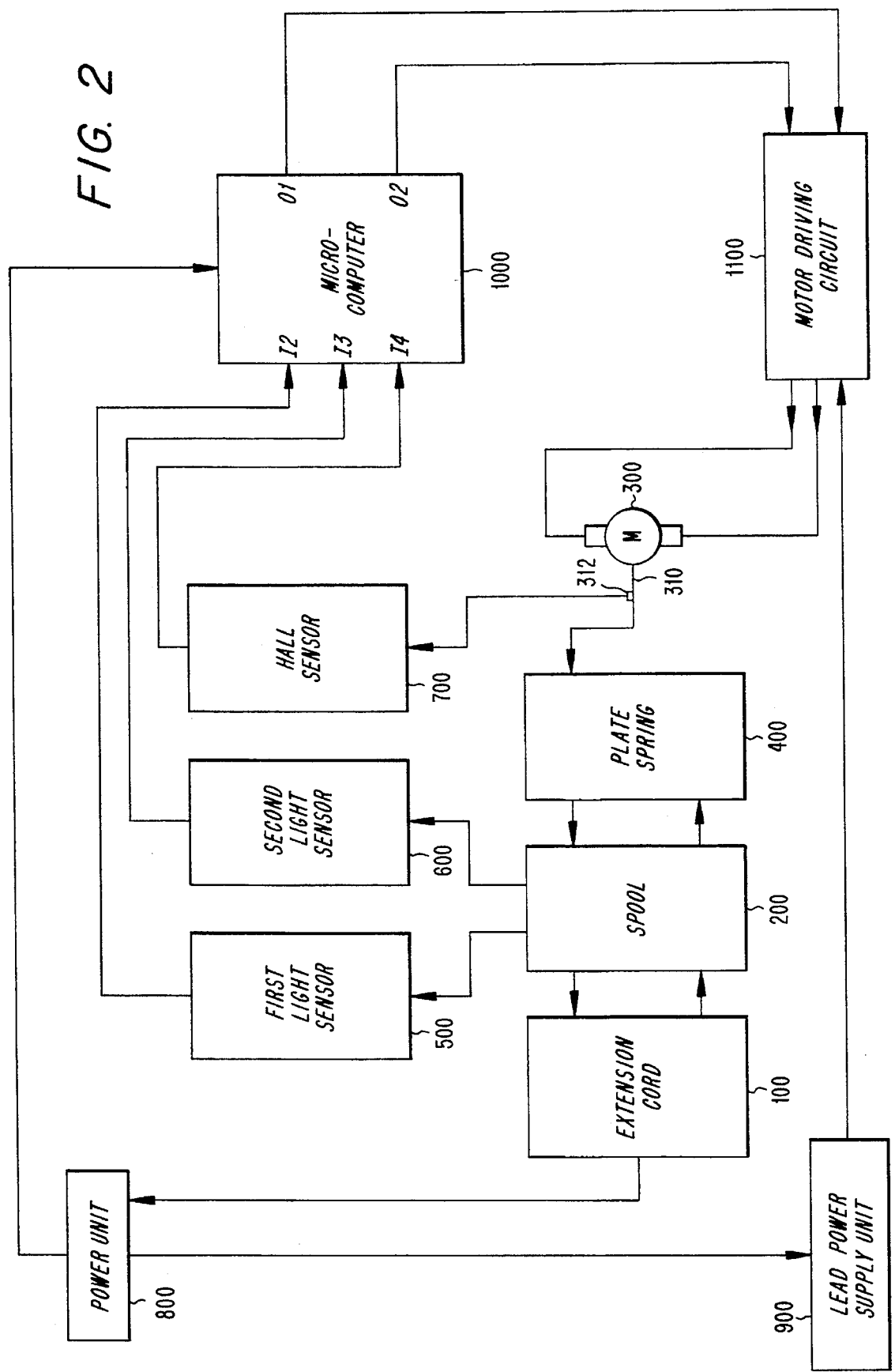

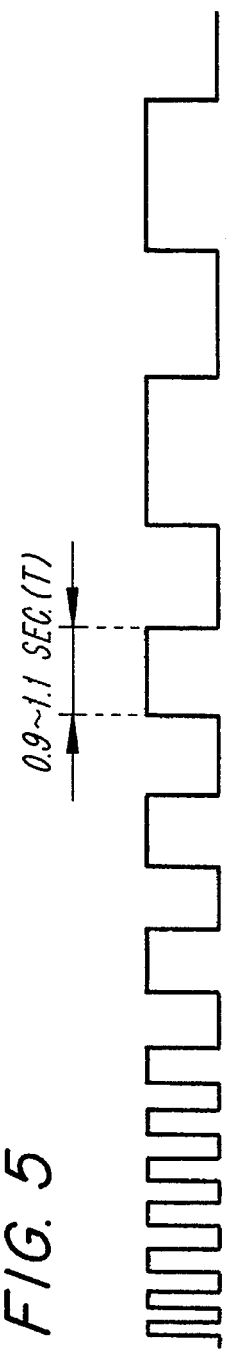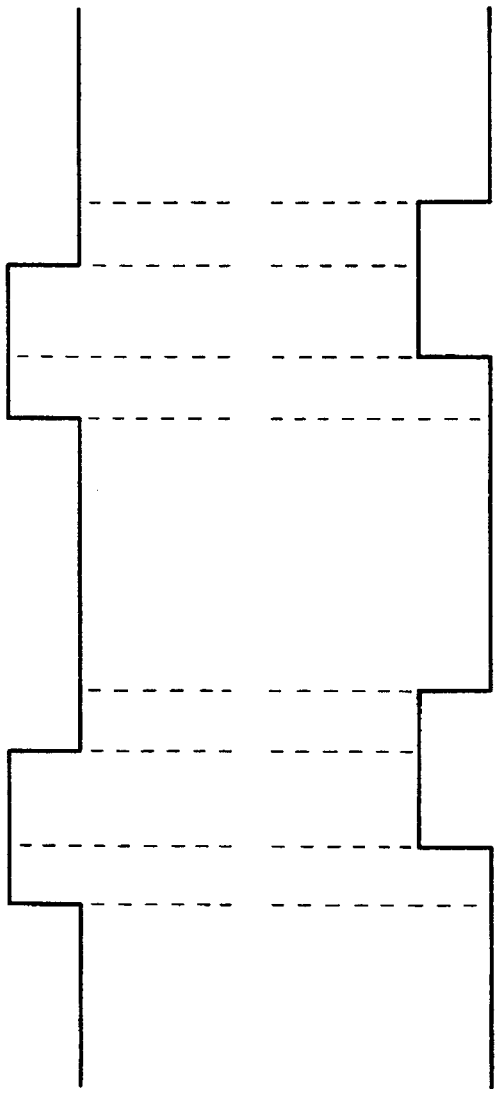

CORD-RETRACTION SIGNAL
FROM FIRST SENSOR 500

CORD-RETRACTION SIGNAL
FROM SECOND SENSOR 600

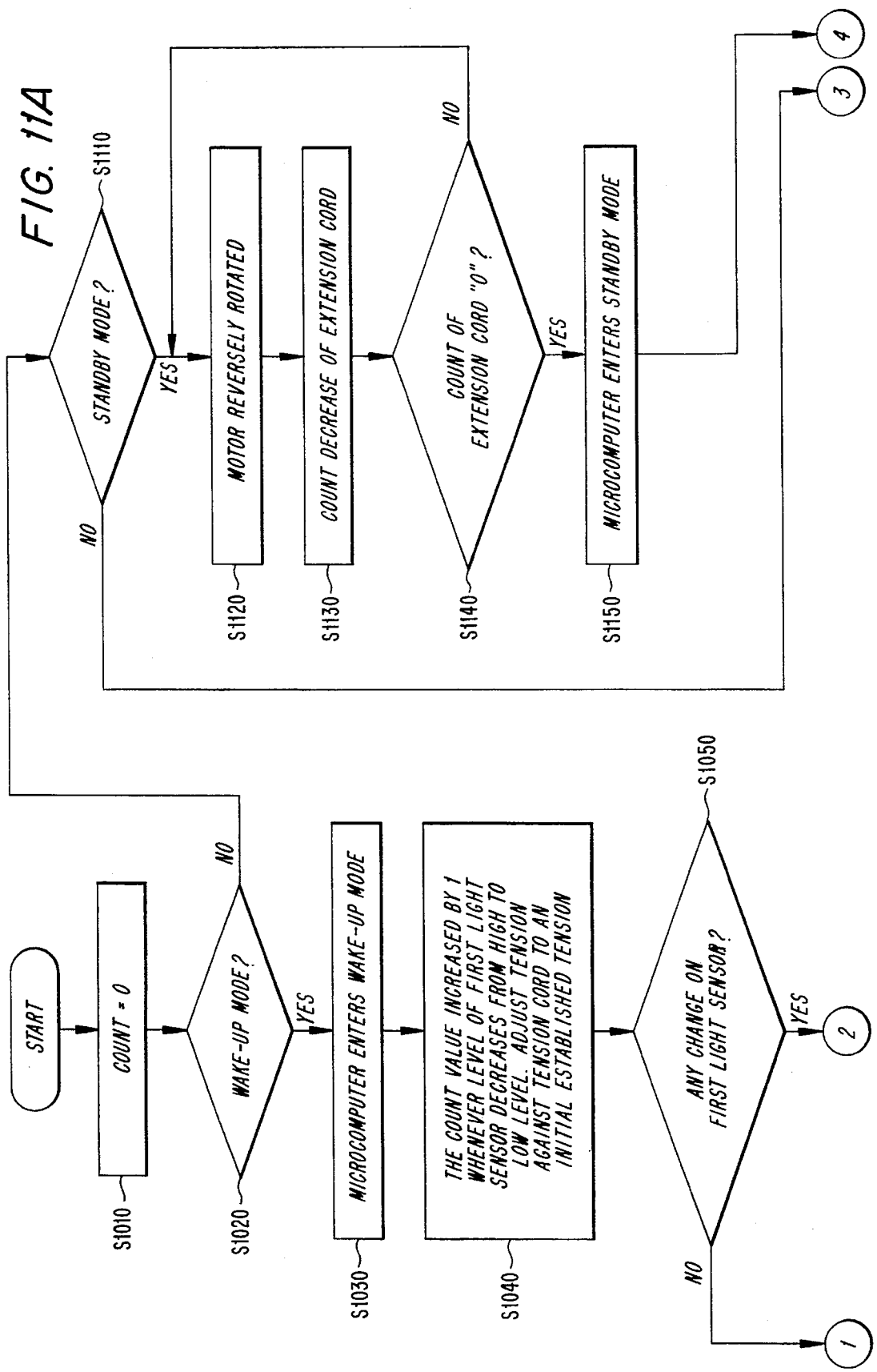

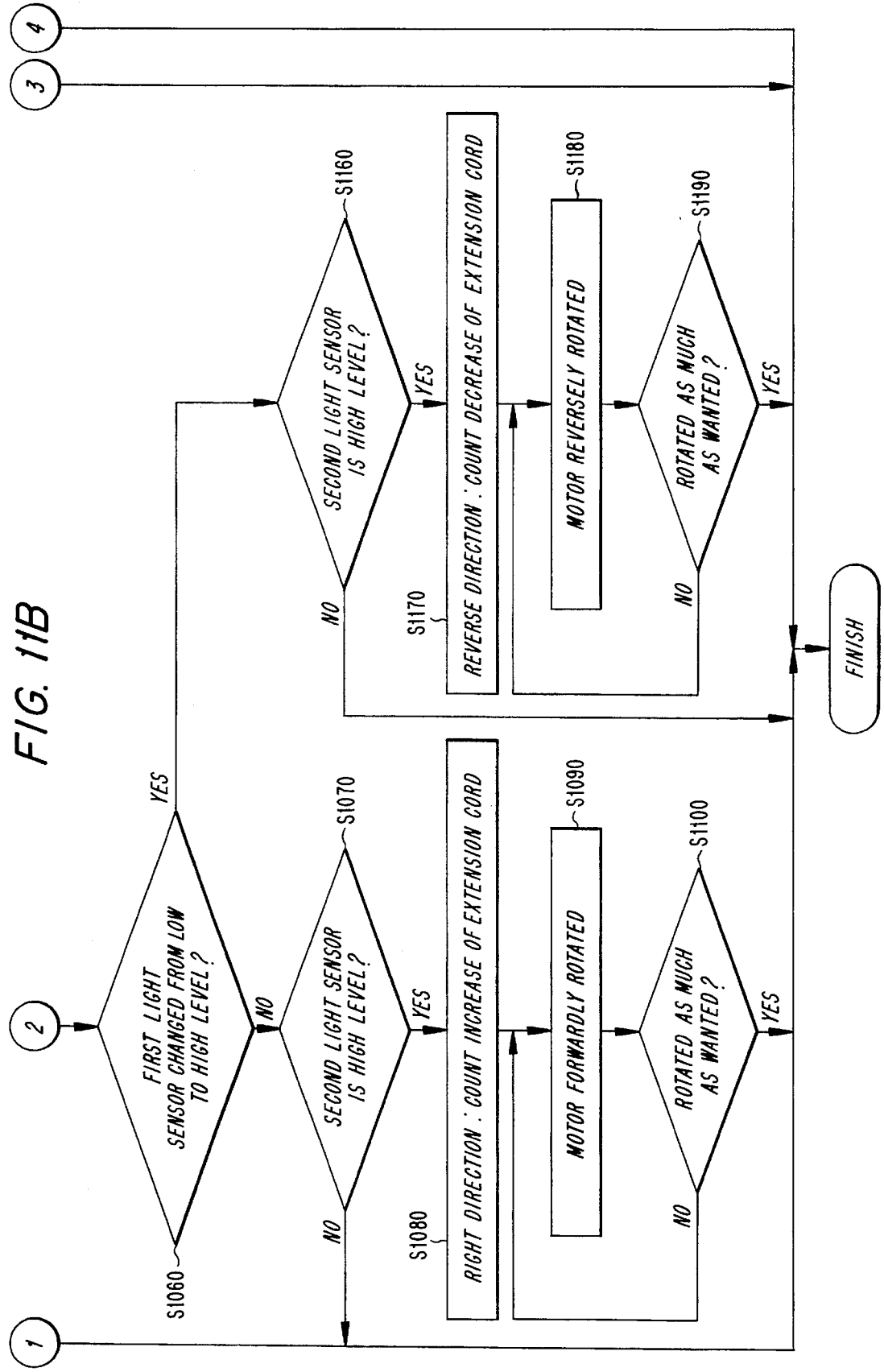

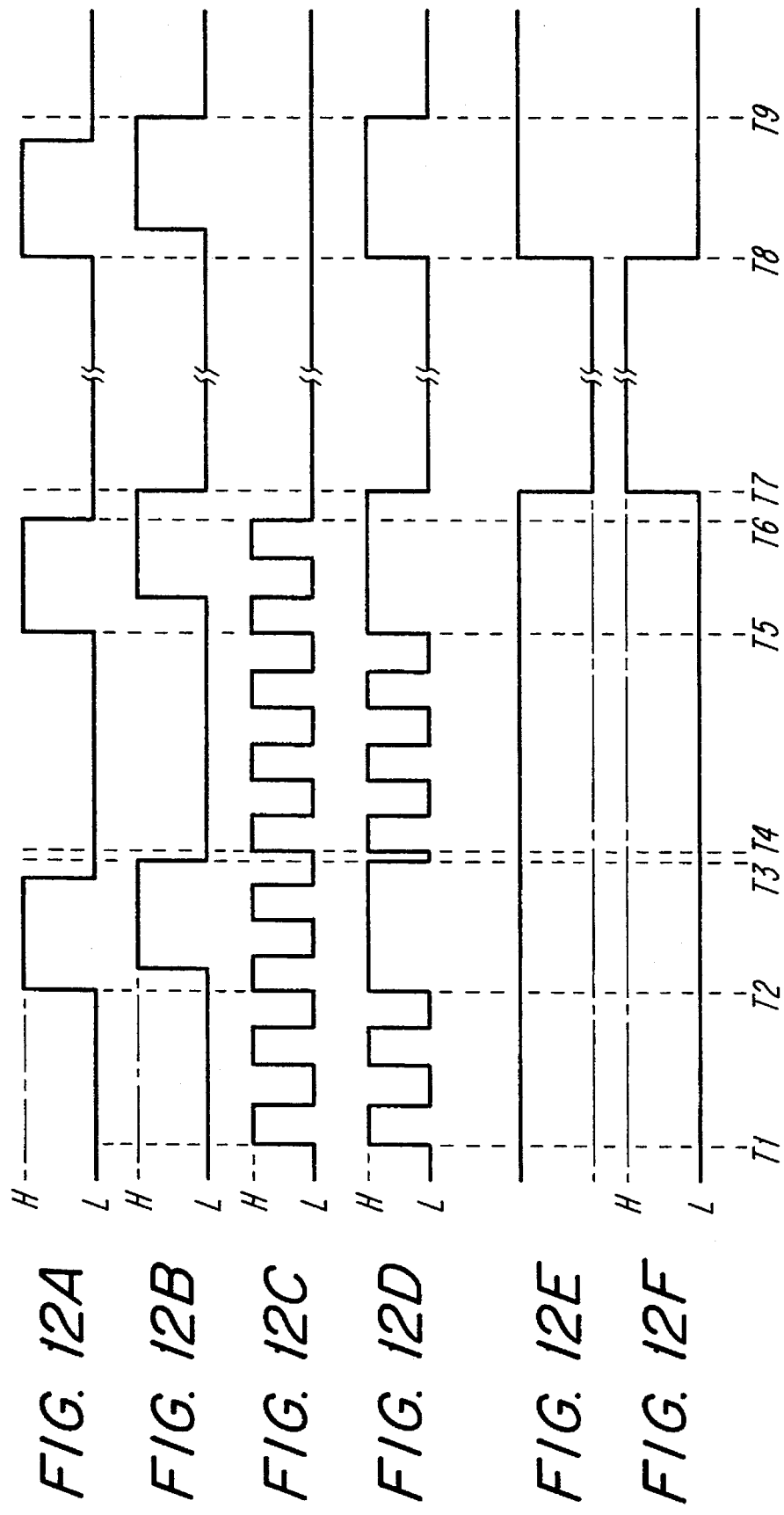

5,498,940

METHODS AND APPARATUS FOR MAINTAINING A CONSTANT TENSION ON AN ELECTRICAL CORD OF A ROBOT

BACKGROUND OF THE INVENTION

1. Field of the Invention

The present invention relates to an extracting apparatus and a tension-keeping method of a power supply cord in a robot, by which the cord can always maintain a predetermined force of tension regardless of a distance between the robot and an outlet.

2. Description of Prior Art

In a conventional robot, in order to pull out an cord from the robot, the cord is forcibly extracted. In order to retract the cord into the robot, a push button is pressed to thereby cause the cord to be drawn into the robot at a high speed by force of a spiral plate spring therein.

Although most self-propelled robotic vacuum cleaners come in cordless styles, in some self-propelled corded cleaners, the cord should maintain a straight line between the cleaner and the outlet, so that the cord cannot be a hindrance to travelling of the robot. Accordingly, in a conventional self-propelled corded cleaner equipped with a push-button switch for an cord operation, there is a shortcoming in that when the cleaner travels near the electric outlet, it may run over the cord.

Furthermore there has been another problem in that, the more a distance between the cleaner and the outlet is increased, the more tension is given to the cord by the spiral plate spring, thereby resulting in a generation of uncleaned region of space caused by immobilization of the robotic cleaner by an excessively tensioned cord.

Accordingly, the present invention has been proposed to solve the above problems and it is an object of the present invention to maintain a predetermined force of tension on an cord at all times regardless of a distance between a robot and an outlet, so that travel of the robot can be facilitated and the robot can clean all the cleaning area.

SUMMARY OF THE INVENTION

In accordance with one aspect of the present invention, there is provided an extracting apparatus of an cord in a robot, the apparatus comprising: a motor; a plate spring for being fixed at one inner end to a rotational surface of the motor; a rotation plate to which an external end tip of the plate spring is fixed while being wound by the cord; a power source unit for receiving an alternating voltage through the cord to thereby output a direct voltage when the cord is extracted from a body of the robot to thereby be inserted into an outlet disposed at a region of space; a first and a second light sensors for detecting a distance which varies between the cord and the outlet when the body of the robot is moved by an operation start command of a user to thereby output a revolution signal; a microcomputer for receiving the revolution signal outputted from the first and second light sensors to thereby output a rotation command signal which orders the motor to rotate upto an amount corresponding to the revolution signal; a motor driving circuit for receiving a motor revolution command signal to thereby rotate the motor either clockwise or counterclockwise; a hall sensor for detecting the revolution of the motor to thereby output the same to the microcomputer; and an input power source supply unit for supplying a direct current source for rotating the motor to the motor driving circuit when the cord is extracted from the outlet.

In accordance with another aspect of the present invention, there is provided an extracting apparatus of an cord in a robot, the apparatus comprising: a battery rechargeable by way of an external power source; a power supply circuit for receiving one voltage either from an alternating voltage outputted from the external power source or from a direct voltage outputted from the battery to thereby supply two kinds of power sources in a first direct current voltage and a second direct current voltage; a microcomputer for receiving the second direct current voltage outputted from the power source circuit to thereby control an overall operation of the robot when the robot is under a wake-up mode of normal operation state and under a standby mode of a minimum power keeping state in the robot; and extension cord for connecting the external power source to the power source supply circuit; a rotation plate for rotating to thereby let the cord extracted and pulled in; a plate spring for being disposed on an inner side of the rotation plate to thereby generate a turning effect on the rotation plate to a reverse direction where the cord is led in when the rotation plate is rotated in right direction by way of extraction of the cord; a first and a second light sensors for detecting a right direction rotation and a reverse direction rotation of the rotation plate in order to output to the microcomputer a right direction revolution signal when the rotation plate is rotated to the right direction and in order to output to the microcomputer a reverse direction revolution signal when the rotation plate is rotated to the reverse direction; an indication means for receiving an indication signal outputted from the microcomputer to thereby indicate an extracted length of the cord; a motor wherein a rotational shaft is jointed to an inner end tip of the spiral plate spring to thereby be rotated in the left and right directions; a motor driving circuit for receiving the first direct current voltage outputted from the power source supply circuit to thereby receive an operation command signal outputted from the motor against the motor, so that the motor can be driven to a rotational direction corresponding to the operation command signal; a Hall sensor for being disposed around the rotational shaft of the motor to thereby output to the microcomputer a revolution signal indicative of revolved frequency of the motor; an external power source supply detecting circuit for outputting to the microcomputer a signal indicating that the external power source is supplied to the power source supply circuit through the cord; a signal transmission circuit for transmitting to the microcomputer a signal outputted from the external power source supply detecting circuit, the first light sensor and the second light sensor; and a standby mode signal supply circuit wherein, when the external power source is not supplied to the power source supply circuit through the cord, a standby mode signal of high level is outputted to the microcomputer, so that the microcomputer can output an operation command signal for rotating the motor in the reverse way and the motor can be rotated in the reverse direction to thereby put the extracted cord fully into the body of the robot, whereby the robot enters into a standby mode to minimize the consumed electricity of the robot.

Furthermore, in accordance with still another aspect of the present invention, there is provided a tension-keeping method of an cord in a robot, the method comprising: a first step for extracting an cord from a body of the robot to thereby be inserted into an outlet where electric power source is supplied; a second step for supplying the power source to the robot; a third step for rotating the motor clockwise; a fourth step for comparing whether a duration time of a revolution signal of high level being inputted from a hall sensor is within an established scope; a fifth step for rotating the motor three times counterclockwise when the duration time of the revolution signal of high level inputted from the hall sensor in the fourth step is within the established scope; a sixth step for moving the robot with the same starting the operation; a seventh step for comparing whether there is a change in a level of the revolution signal inputted from the first light sensor; an eigth step for comparing whether a change is a down mode from a high level to a low level when there is the change in the level of the signal inputted from the first light sensor in the seventh step; a ninth step for comparing whether the level of the revolution signal inputted from the second light sensor is high when the level change of the revolution signal inputted from the first light sensor in the light step is down mode; a tenth step for increasing a count number against length of the cord when the level of the revolution signal inputted from the second light sensor in the ninth step is discriminated as light an eleventh step for rotating the motor counterclockwise up to as many number as the increased count number determined in the tenth step; and a twelth step for comparing whether the motor has been correspondingly rotated upto the count number determined at the tenth step.

In accordance with still another aspect of the present invention, there is provided a tension-keeping method of an cord in a robot, the method comprising: an initialization step for establishing as "0" a count value indicative of an extracted length of the cord; a wakeup mode discrimination step for discriminating whether a peripheral environment of the microcomputer is a wakeup call mode; a normal operation mode entry step where the microcomputer enters a normal operation mode when it is discriminated that the peripheral environment of the microcomputer is the wake-up mode at the wake-up mode discrimination step; a count increase & initial tension control step for increasing the count value by one (1) and at the same time for rotating the motor to thereby adjust tension against the cord to an established initial tension whenever the level of in & out signals outputted from the first light sensor drop from ligh level to low level; a first light sensor variation discrimination step for discriminating whether there is any change in the first light sensor; a high level direction discrimination step for discriminating whether the variation in the first light sensor has increased from low level to high level when it is discriminated that there has been a variation in the first light sensor at the first light sensor variation discrimination step; a first high level discrimination step for discriminating whether the second light sensor has reached a high level when it is discriminated that the first light sensor has not changed from low level to high level at the high level direction discrimination step; a count increase step where the microcomputer discriminates a progressing direction of the cord as a right direction to thereby increase the count value when it is discriminated that the second light sensor is in high level at the first high level discrimination step; a right rotation step for rotating the motor in the right direction to as many counts as the increased count value; a right direction discrimination step for discriminating whether the motor has rotated to as many as the increased count value in the right direction; ans a tension keeping control step for keeping performing a tension keeping control against the cord when it is discriminated that the motor has rotated in the right direction upto as many counts as the increased count value at the right rotation discrimination step.

BRIEF DESCRIPTION OF THE DRAWINGS

For fuller understanding of the nature and objects of the invention, reference should be made to the following detailed description taken in conjunction with the accompanying drawings in which:

FIG. 2 is a block diagram of an extracting apparatus of a power supply cord cord in a robot according to the first embodiment of the present invention;

FIG. 5 is a waveform drawing of a revolution signal outputted form a Hall Sensor as illustrated in FIGS. 1, 2 and 3 when a motor is rotated in order to determine an initial tension;

FIG. 6A is a waveform drawing of a revolution signal outputted from a first light sensor as illustrated in FIGS. 1, 2 and 3 when the cord is extracted;

FIG. 6B is a waveform drawing of a revolution signal outputted from a second light sensor as illustrated in FIGS 1, 2 and 3 when the cord is pulled in;

FIG. 7A is a waveform drawing of a revolution signal outputted from the first light sensor as illustrated in FIGS. 1, 2 and 3 when the extension cord is pulled in;

FIG. 7B is a waveform drawing of a revolution signal outputted from the second light sensor as illustrated in FIGS. 1, 2 and 3 when the extension cord is pulled in;

FIG. 11 is a flow chart for illustrating a tension-keeping method of an for the cord cord in a robot according to the second embodiment of the present invention; and FIG. 12 is a waveform drawing of each part in FIGS. 8 and 9.

DETAILED DESCRIPTION OF PREFERRED EMBODIMENTS OF THE INVENTION

The present invention will be described in connection with the following embodiments thereof with reference with the accompanying drawings.

Figure 1A:
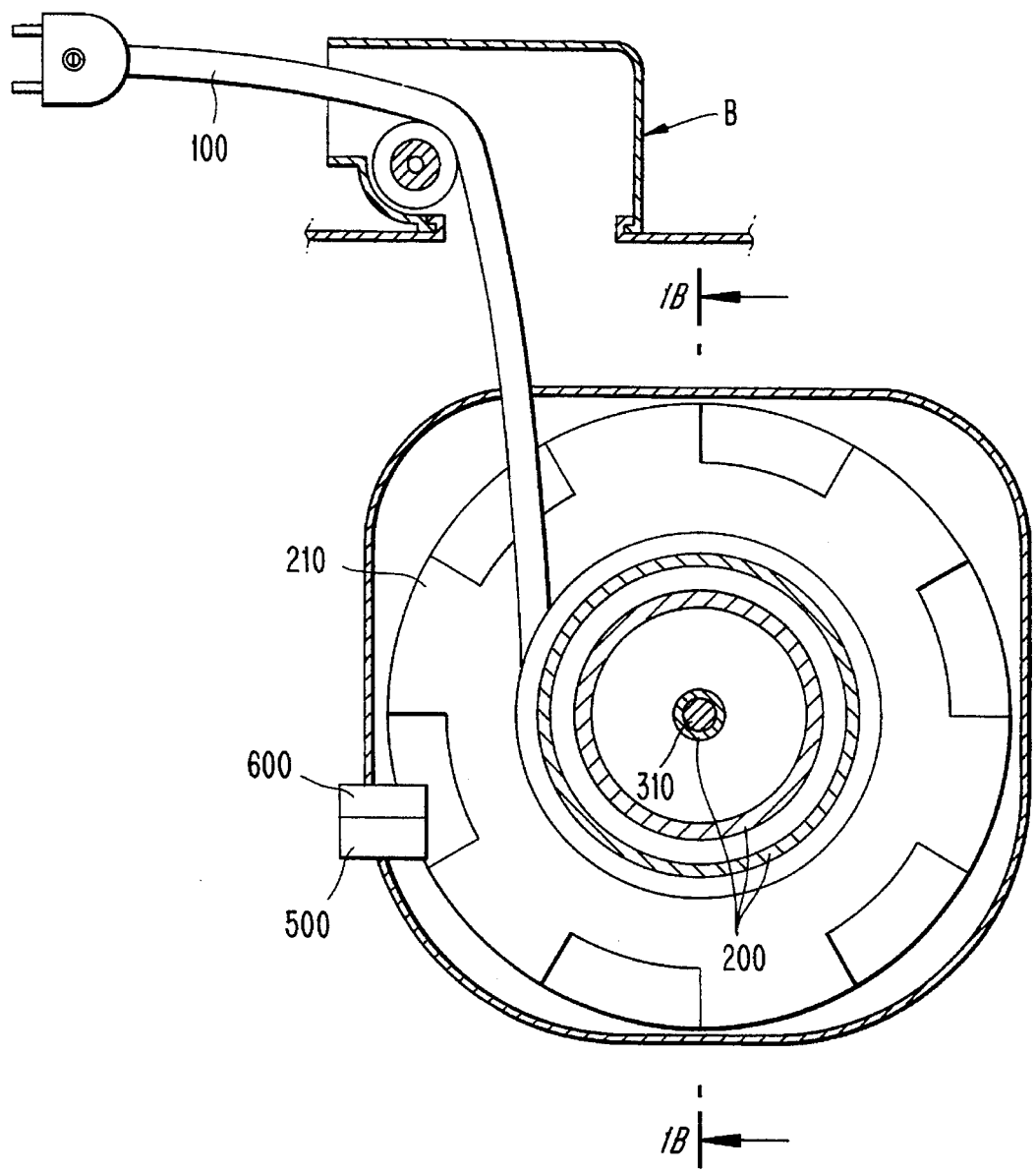
FIG. 1A is a longitudinal sectional view of an extracting apparatus of a power supply cord cord in a robot according to a first embodiment of the present invention.
Figure 1B:
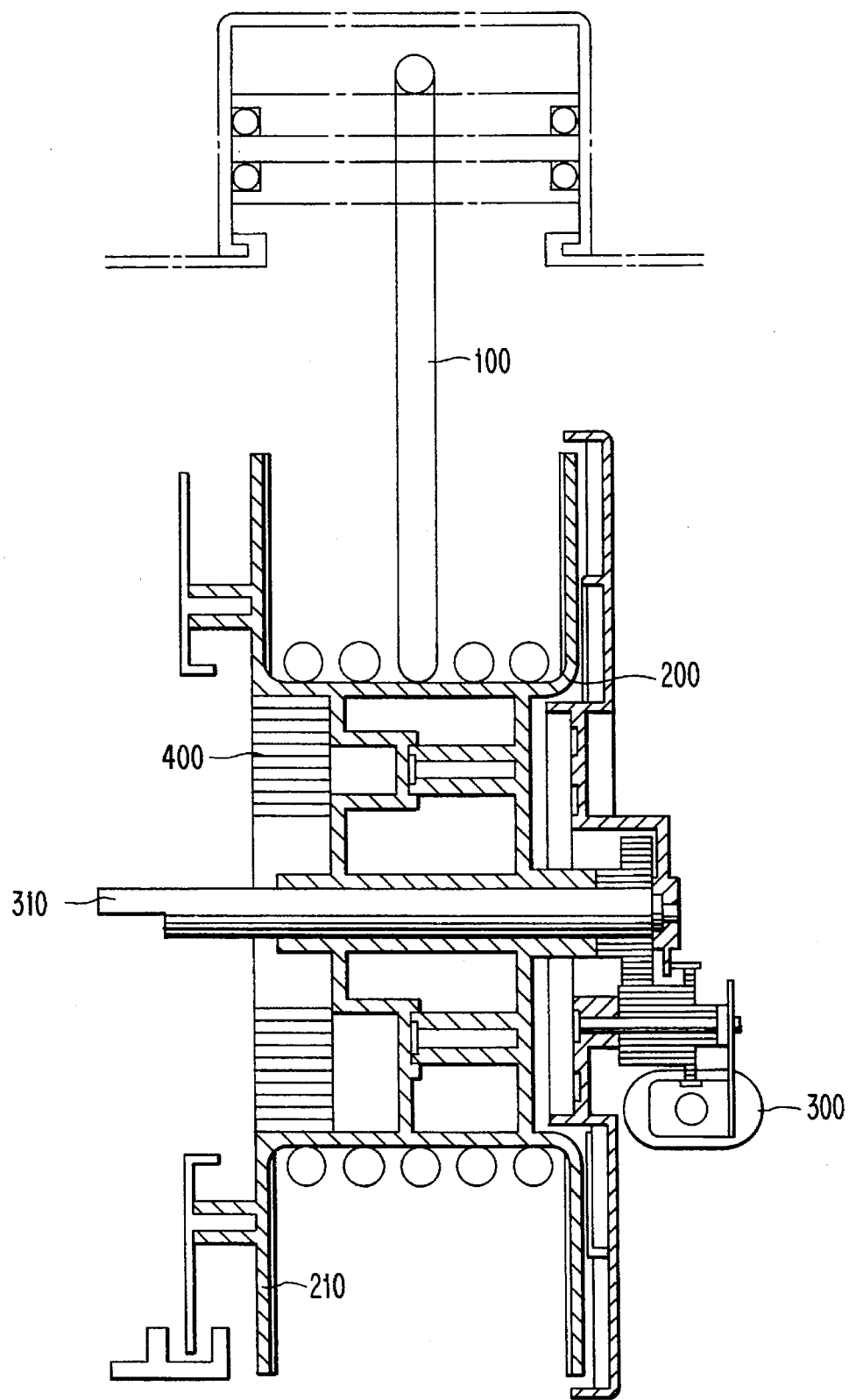
FIG. 1B is a sectional view along A—A line in FIG. 1A.

FIGS. 1 and 2 show an electrical power supply cord 100 in order to supply power to a body B of a robot.

A motor 300 used for extracting and pulling in the p cord is disposed adjacent a rotation plate or spool 200 and the motor is a direct current motor which can be rotated in both directions when the polarity of a 12 V direct current voltage applied to a positive (+) terminal and a negative (−) terminal of the motor changes and which can be changed in speed by control of a pulse width modulation PWM realized in a microcomputer 1000 (explained later).

A magnet piece 312 (FIG. 2) is disposed on an end tip of a rotational shaft 310 driven by the motor in order to transmit a revolution signal of the motor 300 to a Hall sensor (explained later).

A plate spring 400 for generating tension on the cord is spirally formed and an inner end of the plate spring 400 is fixed to the rotational shaft 310 while an external end of the plate spring 400 is fixed to an inner side of the rotational plate 200.

The rotational plate 200 has a continuous annular protrusion 210 formed along a periphery of the rotational plate 200 in order to transmit a revolution signal to first and second light sensors 500,600 (explained later).

The first light sensor 500 and the second light sensor 600 (FIG. 2) are disposed near the protrusion 210 of the rotational plate 200 in order to output signal representative of the number of rotations of the rotational plate 200 to a microcomputer (explained later).

A Hall sensor 700, illustrated in FIG. 2, is disposed near a magnetic piece 312 (FIG. 2) of the rotational shaft 310 in the motor 300 in order to output a signal representative of shaft revolutions to the microcomputer (explained later).

A power source supply unit 800 for outputting a direct current voltage after receipt of an alternating current voltage is disposed adjacent the microcomputer 1000 cord 100 and an incoming power source supply unit 900.

The microcomputer 1000 for receiving the revolution signal outputted from the first and second light sensors 500 and 600 to thereby output a rotation command signal for rotating the motor 300 by a number of times up to a magnitude corresponding to the revolution signal is connected to the first light sensor 500, the second light sensor 600, a Hall sensor 700 and a motor driving circuit 1100.

The motor driving circuit 1100 for receiving a motor rotation command signal from the microcomputer 1000 to thereby rotate the motor 300 either clockwise or counterclockwise is connected to the microcomputer 1000, the motor 300 and the incoming power source supply unit 900.

The incoming power source supply unit 900 for supplying a direct current power source to the motor driving circuit 1100 in order to rotate the motor 300 is connected to the power source supply unit 800 and the motor driving circuit 1100.

Figure 3:
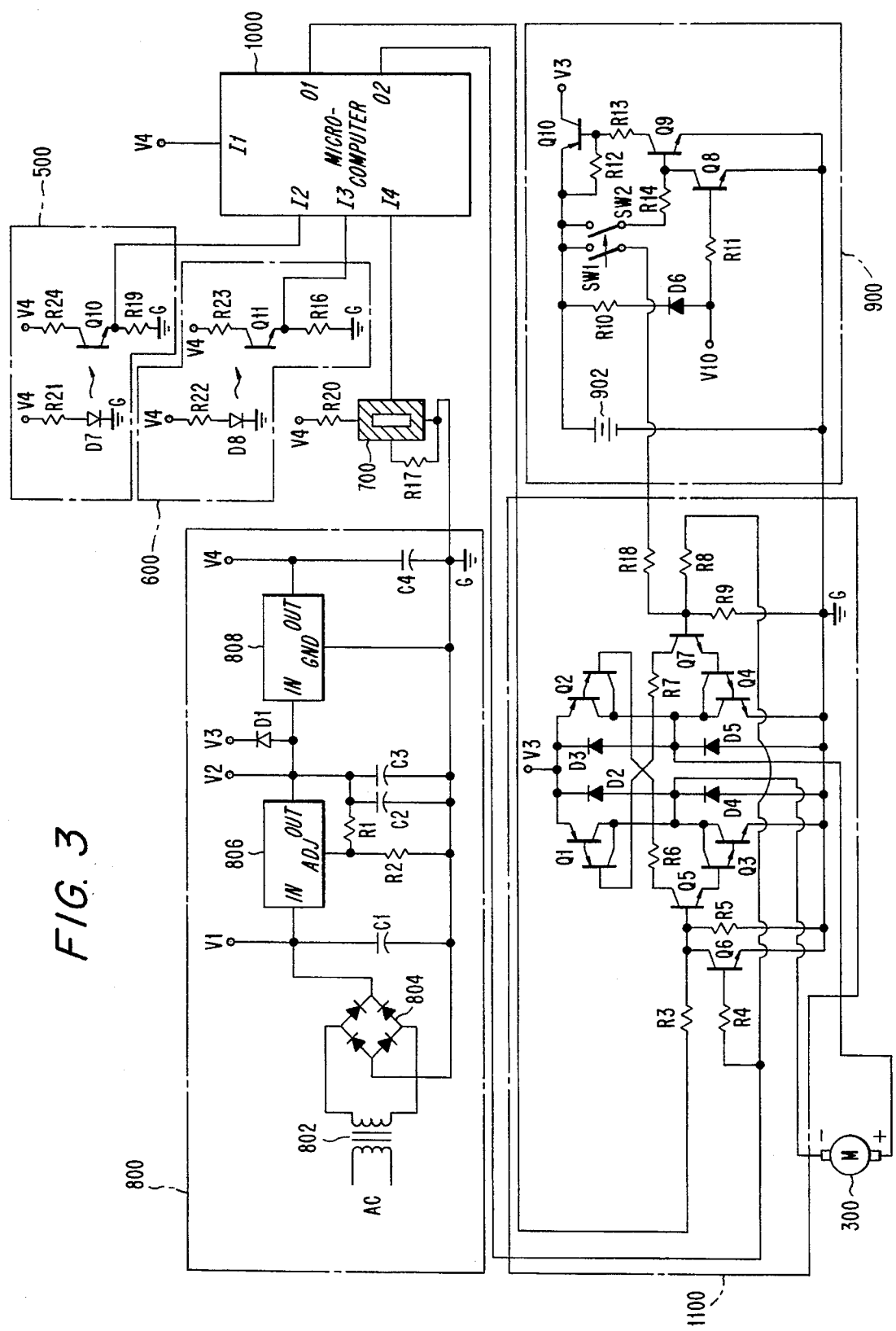
FIG. 3 is a detail view of FIG. 2.
Figure 4A:
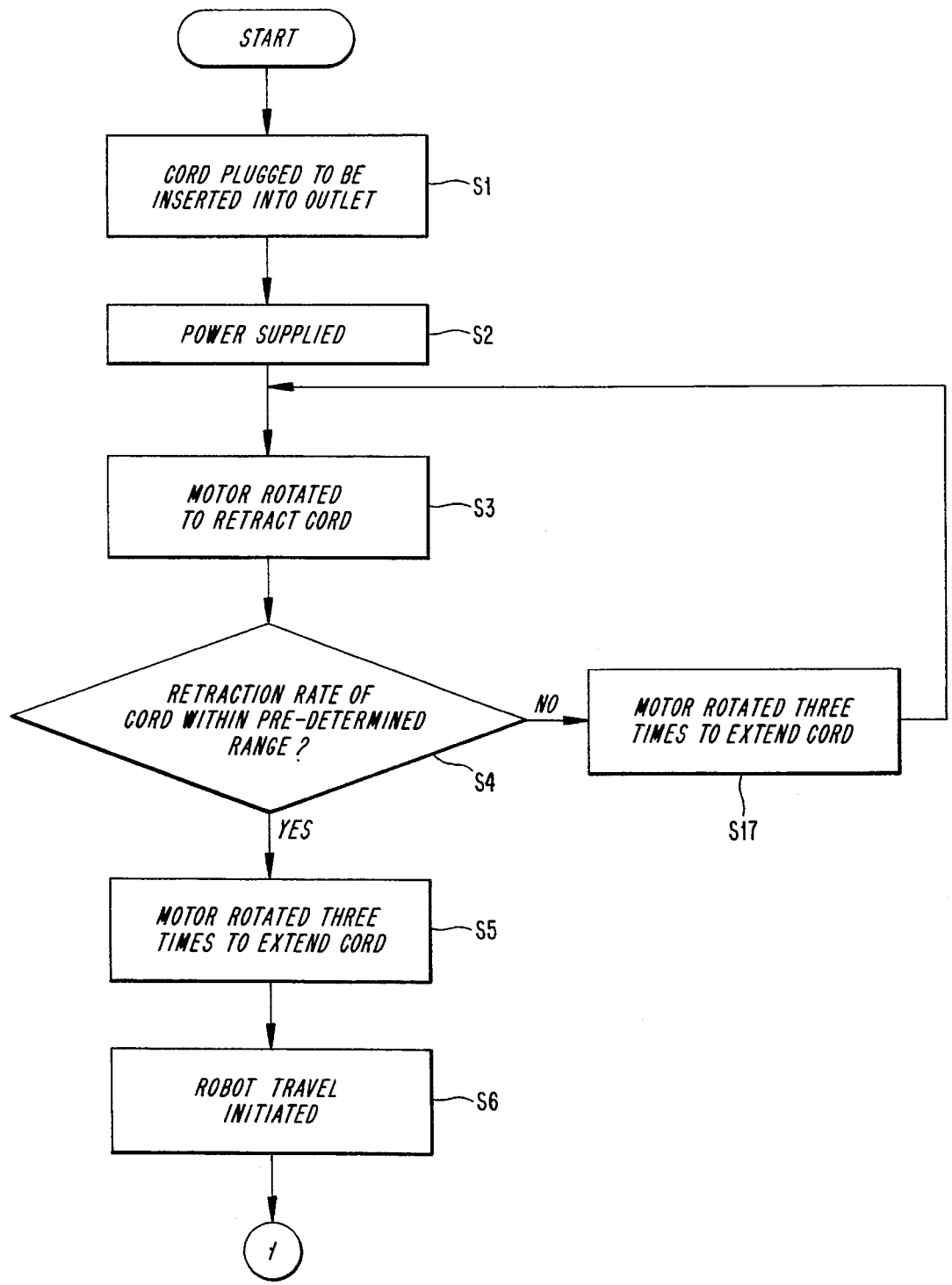
FIG. 4 is a flow chart of a tension-keeping method of an extension cord in a robot according to the first embodiment of the present invention.
Figure 4B:
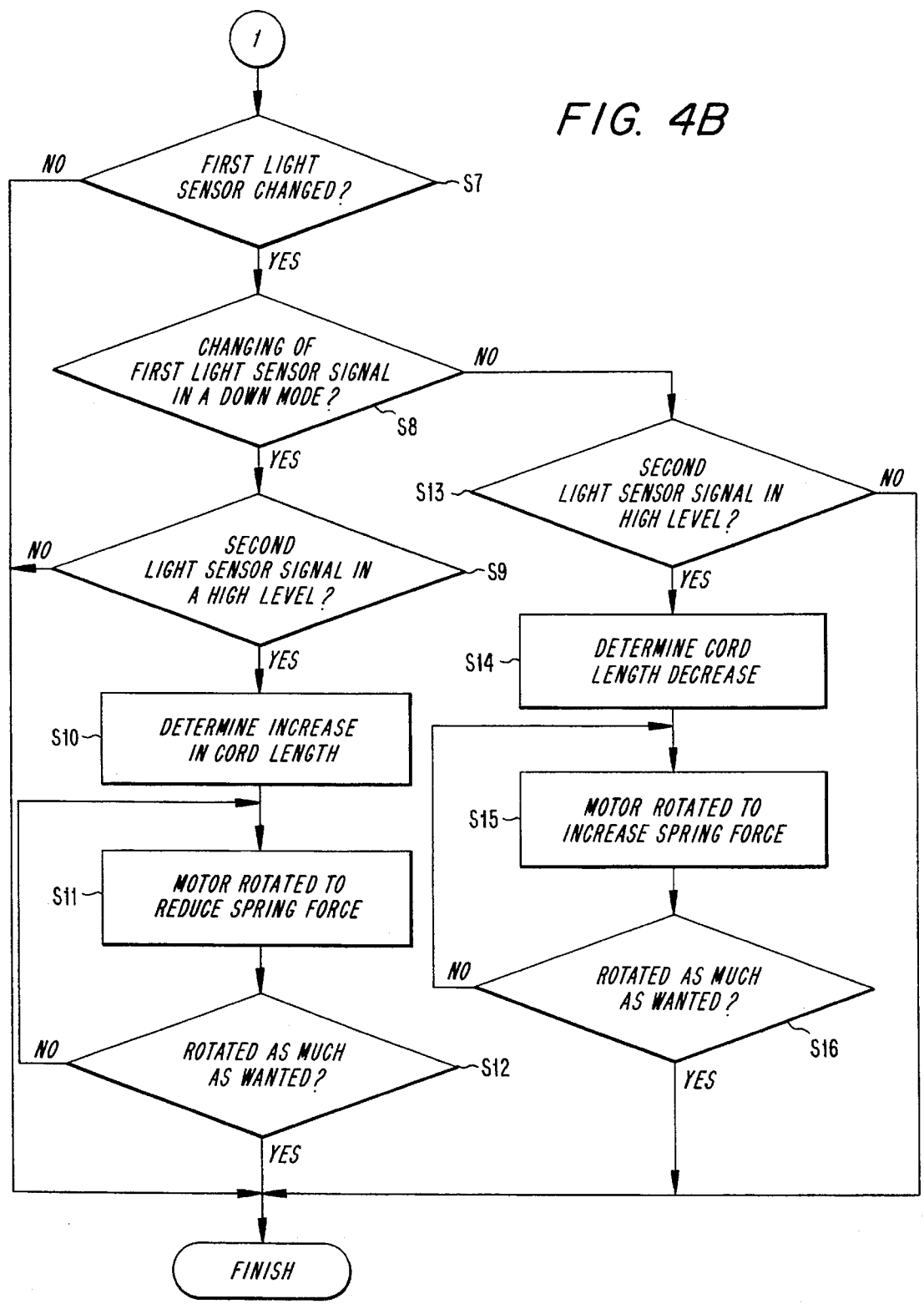

The motor driving circuit 1100, as illustrated in FIG. 3 comprises: a transistor Q5 for being connected at a base terminal to the microcomputer 1000 to thereby be turned on by a right direction signal transmitted from the microcomputer 1000; a Darlington circuit Q3 for being connected at a base to an emitter terminal of the transistor Q5 for activation thereof to thereby be turned on by an application of voltage at the base from the transistor Q5; a Darlington circuit Q2 for being connected at a base via a resistor R6 to a collector terminal of the transistor Q5 to thereby be turned on and apply a right direction driving voltage to the motor when the transistor Q5 and the Darlington circuit Q3 are activated; a transistor Q7 for being connected at a base to the microcomputer 1000 to thereby be turned on by a reverse signal transmitted from the microcomputer 1000; a Darlington circuit Q4 for being connected at a base to an emitter terminal of the transistor Q7 to thereby activate the transistor Q7 and for being turned on by application of voltage to the base from the transistor Q7; a Darlington circuit Q1 for being connected at a base to a collector terminal of the transistor Q7 via a resistor R7 to thereby be activated when the transistor Q7 and the Darlington circuit Q4 are turned on and for applying a reverse direction driving voltage to the motor 300; and a transistor Q6 for receiving a reverse direction signal from the microcomputer 1100 to thereby be turned on and for turning a potential level of a base terminal at the transistor Q5 to low level.

Furthermore, the motor driving circuit 1100 is disposed with 4 diodes D2, D3, D4 and D5, with D2 being connected between a collector terminal and an emitter terminal of the Darlington circuit Q1, D3 being connected between a collector terminal and an emitter terminal of the darlington circuit Q2, D4 being connected between a collector terminal and an emitter terminal of the Darlington circuit Q3 and D5 being connected between a collector terminal and an emitter terminal of the Darlington circuit Q4, respectively in a right direction, in order to reinforce voltages applied to the emitter terminal of the Darlington circuit Q1, the emitter terminal of the darlington circuit Q2, the collector terminal of the Darlington circuit Q3 and to the collector terminal of the Darlington circuit Q4.

Meanwhile, 2 PNP transistors are connected at common collectors to the Darlington circuits Q1 and Q2 and 2 PNP transistors are connected at common collectors to the Darlington circuits Q3 and Q4.

The power source supply unit 800 comprises: a transformer 802 for varying magnitudes of alternating current AC voltage; a bridge diode 804 for transforming the alternating current voltage outputted from the transformer 802 to direct current DC voltage V1; a first voltage regulator 806 for receiving the DC Voltage V1 outputted from the bridge diode 804 to thereby output a DC voltage V2 of 12 V; and a second voltage regulator 808 for receiving DC voltage V2 of 12 V outputted from the first voltage regulator 806 to thereby output a DC voltage V4 of 5 V.

The lead power source supply unit 900 comprises: a battery 902 for being charged by the DC voltage V1 outputted from the bridge diode of the power source supply 800; a first switch SW1 for being turned on in response to the pressing of a lead button to thereby apply a positive (+) voltage of the battery 902 to a base of the turn-on transistor Q7 in the motor driving circuit 1100; a transistor Q9 for being connected to a positive (+) terminal of the battery through a resistor R14 and a switch SW2 to be turned on by the positive voltage (+) of the battery 902 when the lead button is pressed by a user; a transistor Q10 for being connected to a base at a collector terminal of the transistor Q9 through a resistor 13 and for being turned on by being connected to an emitter at a positive(+) terminal of the battery 902 when the transistor Q9 is activated to thereby drive the motor 300 in the reverse direction by way of the positive(+) voltage of the battery 902; and a transistor Q8 for transforming potential level of the transistor Q9 to low level when the direct current voltage V1 is supplied in order to prevent discharge of the battery 902.

Now, a tension-keeping method of for the power supply cord in a robot will be described in accordance with an embodiment of the present invention with reference to FIGS. 4A, 4B, 5, 6 and 7 of an extracting apparatus of for the power supply cord in a robot.

First of all, the robot is moved to a space, and in order to supply power to the robot, the cord 100 is extracted from the body of the robot. (Step S1 in FIG. 4A).

Responsive to the extraction of the cord, the rotation plate 200 is rotated (clockwise if seen in FIG. 1A) while an outer tip end of the plate spring 400 is rotated (clockwise in FIG. 1A) to apply a tension to the cord 100.

At this time, an inner tip end of the plate spring 400 is not rotated and stays in a stationary state as the same is fixed to the rotation shaft 310.

The rotation shaft 310 is coupled with an output shaft of the motor 300 by a worm gear (not shown), so that an even tension is generated by the plate spring 400. The shaft 310 is not rotated unless an electrical signal is applied to the motor.

When the cord is inserted into an outlet, Step S1, an AC voltage is supplied to the motor, Step S2, and the 220 V AC voltage is transformed to a lesser magnitude of AC voltage by the transformer 802.

The lesser magnitude of AC voltage is transformed to DC voltage V1 by the bridge diode 804.

The DC voltage V1 is applied to an anode terminal of the diode D6 in the lead power supply unit 900 and to one end terminal of the resistor R11 to thereby charge the battery 902, and the transistor Q8 turns the transistor Q9 off.

When the transistor Q9 is turned off, thereby turning off a transistor Q10, the DC power charged to the battery is prevented from being discharged to the motor driving circuit 1100.

The DC voltage V1 is transformed to DC voltage V2 of 12 V through the first voltage regulator 806, and the DC voltage V2 is transformed to DC voltage V3 via the diode D1 to thereby be applied to emitter terminals of the Darlington circuits Q1 and Q2 in the motor driving circuit 1100, to cathode terminals of the diodes D2 and D3, and to a collector terminal of a transistor Q10 in the lead power supply unit 900.

At the same time, the 12 V DC voltage V2 is transformed to a 5 V DC voltage (V4) via the second voltage regulator 808, and the 5 V DC voltage (V4) is inputted to a power terminal 11 of the microcomputer 1000, and simultaneously the DC voltage (V4) is applied to the first light sensor 500, the second light sensor 600 and the Hall sensor 700.

When the DC voltage (V4) is supplied to the power terminal 11 of the microcomputer 1000, a reverse direction signal (counterclockwise signal) is outputted from an output terminal 02 of the microcomputer 1000 to thereby activate the transistor Q7 and the Darlington circuit Q4, and in turn activate the Darlington circuit Q1.

As a result, a current flows through a current loop which is formed by the DC voltage (V3) terminal—Darlington circuit Q1—motor(–) terminal—motor(+) terminal—Darlington circuit Q4—ground terminal(G), so that the motor rotates the shaft 310 in a reverse direction (counterclockwise in FIG. 1A). (Step S3)

At this time, the inner tip end of the plate spring 400 is rotated counter clockwise to rotate, so that the rotation plate 200 counterclockwise, and the cord 100 is drawn into the body of the robot by the tension of the spring 400.

The extension cord 100 is easily pulled into the body up to a certain degree but not therebeyond because the plug end thereof is fixedly inserted into the electrical outlet.

Accordingly, although the motor 300 is easily rotated counterclockwise at first, it cannot be rotated after a time of duration elapses.

A waveform is shown in FIG. 5 wherein the rotational operation of the motor 300 is detected by the Hall sensor 700 disposed around the shaft 310 from which an initial revolution of the motor 300 is detected.

As mentioned in the above, the Hall sensor 700 inputs to the microcomputer 1000 a signal whose wave form enabled the microcomputer to determine an interval (T) (i.e., the time required for the motor to rotate the shaft 310 through a given angle to thereby detect therefrom the tension affecting the cord 100, and then determines in Step S4, whether the interval (T) is high, i.e., within an established scope (0.9–1.1 seconds for the present invention), so that the microcomputer can recognize when the most appropriate tension state exists (i.e., when the high level interval remains between 0.9 second and 1.1 seconds. Thus, from FIG. 5 it can be seen that in a left-to-right direction, the time interval required to rotate the shaft 310 through the given angle gradually increases until the predetermined "high level interval" of 0.9–1.1 seconds is reached.

If the interval T of the waveform in the revolution signal outputted from the Hall sensor 700 at Step S4 is determined to be within the established high level time scope (in the case of "Yes"), a right direction signal (clockwise signal) is outputted from an output terminal 01 of the microcomputer 1000 to thereby turn the transistor Q5 and the Darlington circuit Q3 on.

The Darlington circuit Q2 is also rendered conductive. As a result, a current flows through a current loop which is formed by a direct current V3 terminal—Darlington circuit Q2—positive(+) terminal of motor 4—negative(–) terminal of motor 4—Darlington circuit Q3—ground G, so that the output shaft of the motor 300 rotates in a forward (clockwise) direction.

At this time, the right direction signal outputted from the output terminal 01 in the microcomputer 1000 is outputted for as long a time as to rotate the output shaft of the motor 300 in the right direction three revolutions, thereby rotating the shaft 310 clockwise to slightly loosen the cord tension Step S5.

As seen in the aforesaid, if the tension of the cord is adjusted appropriately, the robot starts to operate, Step 6.

When the body of the robot moves, the microcomputer 1000 discriminates whether there is a change in the waveform of the revolution signal outputted from the first light sensor 500, Step S7, and as a result of the discrimination, if there is any change (in the case of "Yes"), flow advances to Step S8, and the microcomputer discriminates whether the change occurred in the first light sensor 500 is a down mode (to the left in FIG. 6A) which would indicate that the cord is being payed-out At this time, if the body of the robot moves away from the outlet, to thereby rotate the rotation plate 200 clockwise as the cord is payed-out the waveforms of the revolution signals outputted from the first light sensor 500 and the second light sensor 600 are illustrated in FIG. 6A and FIG. 6B, respectively. It can thus be determined in which direction the plate 200 is rotating.

If is determined at Step S8 that the level change in the revolution cycle outputted from the first light sensor 500 is a down mode (in the case of "Yes"), flow advances to Step S9 to determine if the level of the second light sensor 600 is at the high level, and if it is at the high level (in case of "Yes"), it is concluded that the cord is being payed-out, so flow proceeds to Step S10 to thereby increase in the microcomputer the count representing a payed-out length of the cord as per the same pulse number inputted from the first light sensor, Step S10.

Next, a right direction (clockwise) signal is outputted from the output terminal 01 of the microcomputer 1000, and the motor 300 shaft 310 is rotated clockwise by the operation of the motor driving circuit 1100 up to as many counts received from the light sensors 500, 600 which represent the extended length of the cord, Step S11.

As seen above, the counterclockwise rotation of the shaft 310 causes the tension strongly applied to the cord 100 (due to the movement of the robot) to return to the initial appropriate tension force.

Flow now proceeds to Step S12, and the microcomputer 1000 compares whether the motor 300 has rotated to correspond to the new payed-out length of the cord 100 represented by the revolution waveform inputted to an input terminal 14 of the microcomputer 1000 from the Hall sensor 700. If the case of "yes", the microcomputer keeps performing rotation control of the motor 300 according to the aforesaid tension detection and the result thereof.

Meanwhile, returning now to step S4, if the time interval of the revolution signal inputted from the Hall sensor 700 is not within the established range (in the case of "NO"), flow proceeds to Step S17 to thereby rotate the motor 300 three times clockwise, so that the tension can be released. Then flow advances to Step S3, thereby rotating the motor 300.

In other words, this case means that the cord is inserted into the outlet while the body is far distanced from the outlet, and the motor 300 is kept rotating counterclockwise until appropriate initial tension is reached by repeated operations of the Steps S4 and S17.

Furthermore, if it is determined that there is no change in the waveform of the revolution signal outputted from the first light sensor at aforesaid Step S7 (in the case of "No"), the microcomputer 1000 keeps checking whether there is any change in the level of revolution signal outputted from the first light sensor 500.

Figures 7A, 7B:
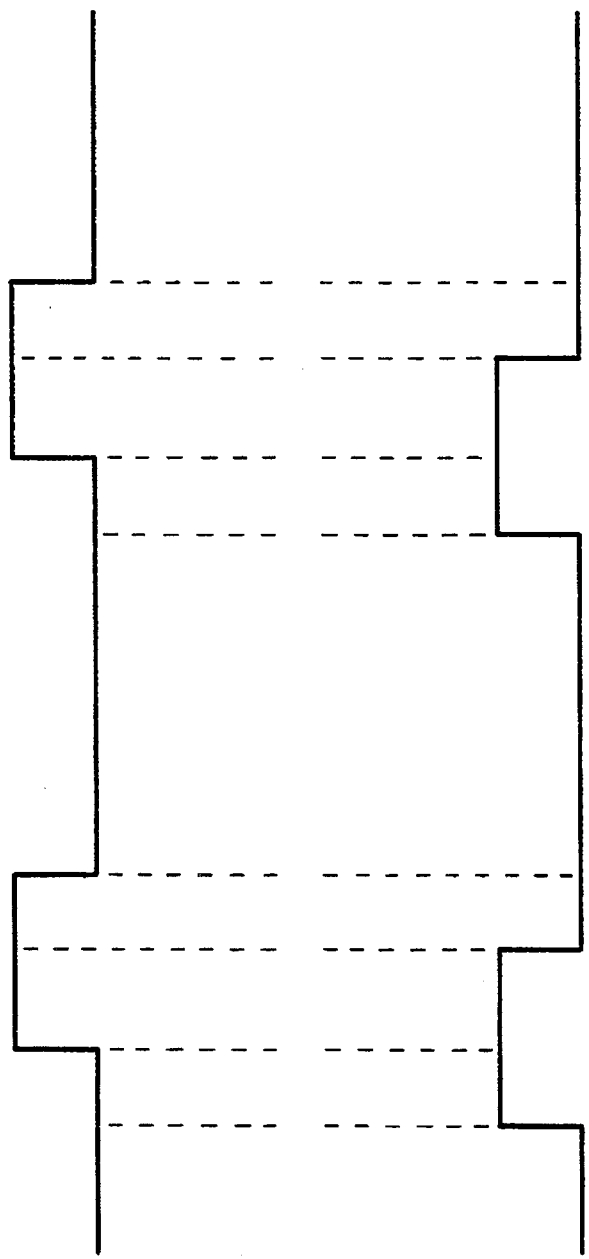

Meanwhile, if the body moves nearer to the outlet to thereby cause the rotation plate 200 to rotate counterclockwise by means of the elasticity of the plate spring 400, the waveforms of the revolution signals outputted from the first and second light sensors 500 and 600 respectively are illustrated in FIG. 7A and 7B. The signals from those light sensors are compared in order to determine the direction of rotation of the plate 200.

That is, if the level change of the first light sensor 500 at the aforesaid Step S8 is not in the down mode falling from high level to low level, rather is in the up mode ascending to high level from low level (in the case of "No"), flow proceeds to Step S13 and the microcomputer 1000 compares whether the level of the second sensor 600 is a high level.

As a result of the comparison, if the level of the second light sensor 600 is a high level (in the case of "No"), the count number relating to the length of the cord 100 allocated within the microcomputer 1000 is decreased, Step 14, to reflect that the cord length is being reduced.

In other words, in this case, the distance between the body and the outlet becomes closer to thereby have a state where the cord is led into the body by the elasticity of the plate spring 400, and the microcomputer 1000 becomes ready to rotate the motor 300 in the reverse direction to rotate the shaft 310 counterclockwise in order to bring the weakened tension of the cord 100 up to the original established tension.

Next, flow proceeds to Step S15, and a reverse direction signal is outputted from the output terminal 02 of the microcomputer 1000 to make the motor the shaft 310 in the reverse direction (counterclockwise) by way of the operation of the motor driving circuit 1100. Then the inner end tip of the plate spring 400 is rotated counterclockwise up to the count number representing the decreased length of the cord 100.

Accordingly, the weakened tension of the cord 100 returns to the initial appropriate tension force, so that the cord between the body and the outlet maintains a state of a straight line.

Flow now advances to Step 16 from Step 15, and the microcomputer 1000 compares whether the motor 300 has rotated as many times as the count number representing the decreased length of the cord 100 through the revolution waveform inputted from the Hall sensor 700 to an input terminal 14 of the microcomputer 1000, and if the motor has rotated as many times as the count number representing the decreased length of the cord (in the case of "Yes"), flow proceeds to the aforementioned Step S7 to thereby keep maintaining the tension against the cord.

Meanwhile, if it is discriminated that the motor 300 has not rotated as many times as the count number representing the decreased length of the cord 100, (in the case of "No"), flow advances to Step S15 and keeps rotating the motor 300 counterclockwise.

If the waveform of the revolution signal outputted from the second light sensor 600 at Steps S9 and S13 is not high level (in the case of "No"), the microcomputer 1000 proceeds to the Step S7 and keeps checking whether there is any level change in the revolution signal inputted from the first light sensor 500.

Meanwhile, if the motor 300 has not rotated as many times as the count number representing the increased length of the extension cord 100 at the Step S12, (in the case of "No"), flow advances to Step S11, and keeps rotating the motor 300 clockwise.

Next, an operation will be described on how the extension cord 100 is led into the body after the work is done.

If the extracted cord 100, is pulled out of the electric outlet, the cord 100 is wound to a degree due to tension of the plate spring 400, and the portion of the cord 100 remaining exposed can be pulled in by press of the button.

When the button is pressed, the first and second switches SW1 and SW2 are rendered conductive.

In other words, a signal from the first switch SW1 is given to the transistor Q7 through a resistor R18 and at the same time, power of a battery 902 renders transistors Q9 and Q10 through a resistor R14 to thereby supply a power source V3 to the motor 300, so that the motor 300 can be rotated to a reverse direction (counterclockwise).

The reverse rotation of the motor 300 causes the rotation plate 200 to rotate reversely through the plate spring 400, so that the cord 1000 can be pulled into the body completely.

As mentioned above, according to one embodiment of the present invention relating to the extracting apparatus and tension-keeping method for the power supply cord of a robot tension changes of the robot body are detected by the first and second light sensors 500 disposed around the rotation plate 200 and detected tension changes are compensated by rotation of the motor 300 to thereby keep a certain tension force at all times on the cord 100 regardless of the distance between the robot and the outlet, so that travel of the robot can be realized smoothly, and as a result, an effect of performing an established work can be realized on a region of space.

Furthermore, according to one embodiment of the present invention relating to an extracting apparatus and tension-keeping method for the cord in a robot, the extension cord is oriented in a straight line so that the robot can accomplish an effect of performing an established work smoothly.

An extracting apparatus for the power supply cord in a robot according to another embodiment of the present invention will be described in the following with reference to the accompanying FIGS. 8, 9 and 10.

Figure 8:
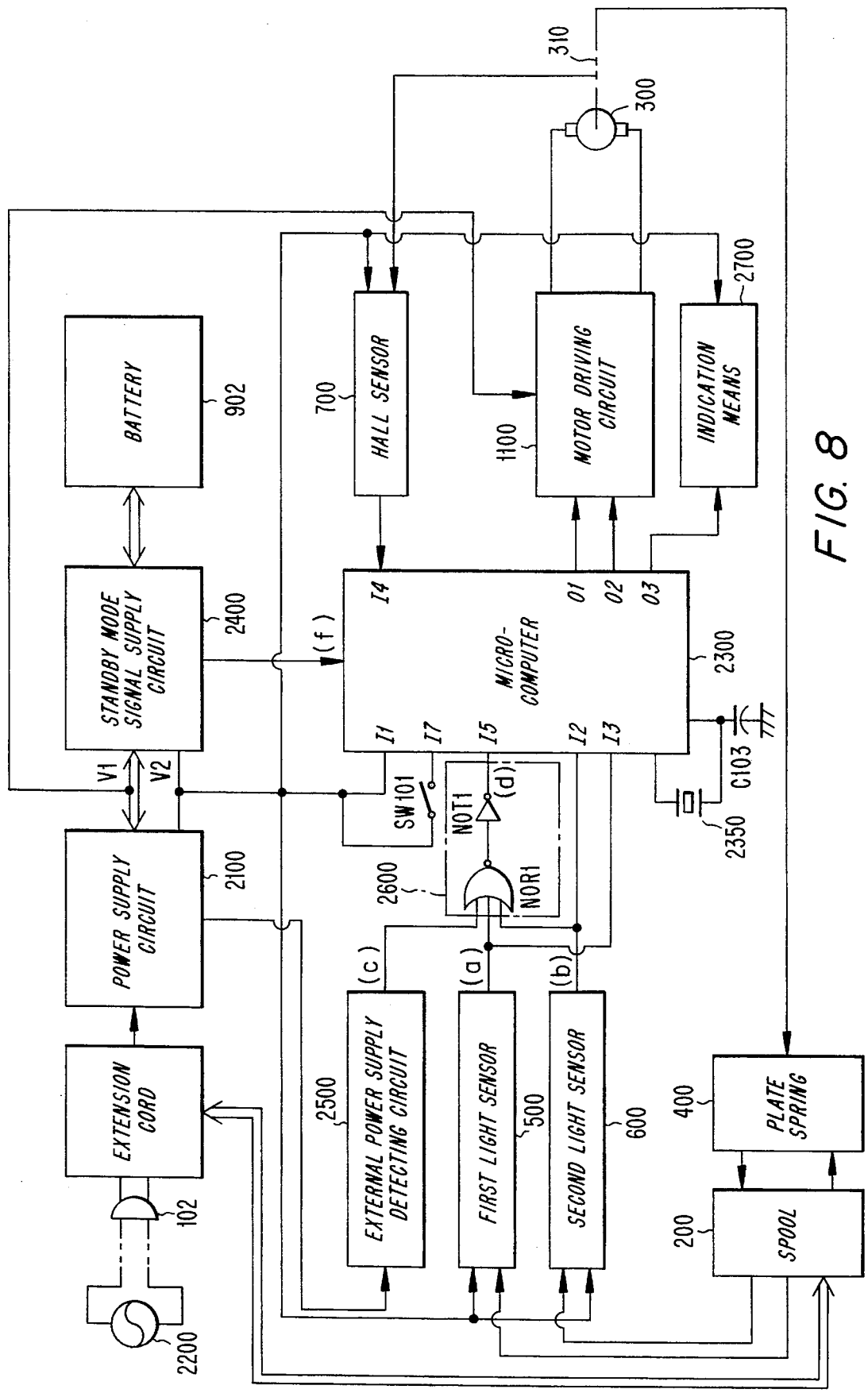
FIG. 8 is a block diagram of an extracting apparatus of an cord in a robot according to a second embodiment of the present invention.
Figure 9:
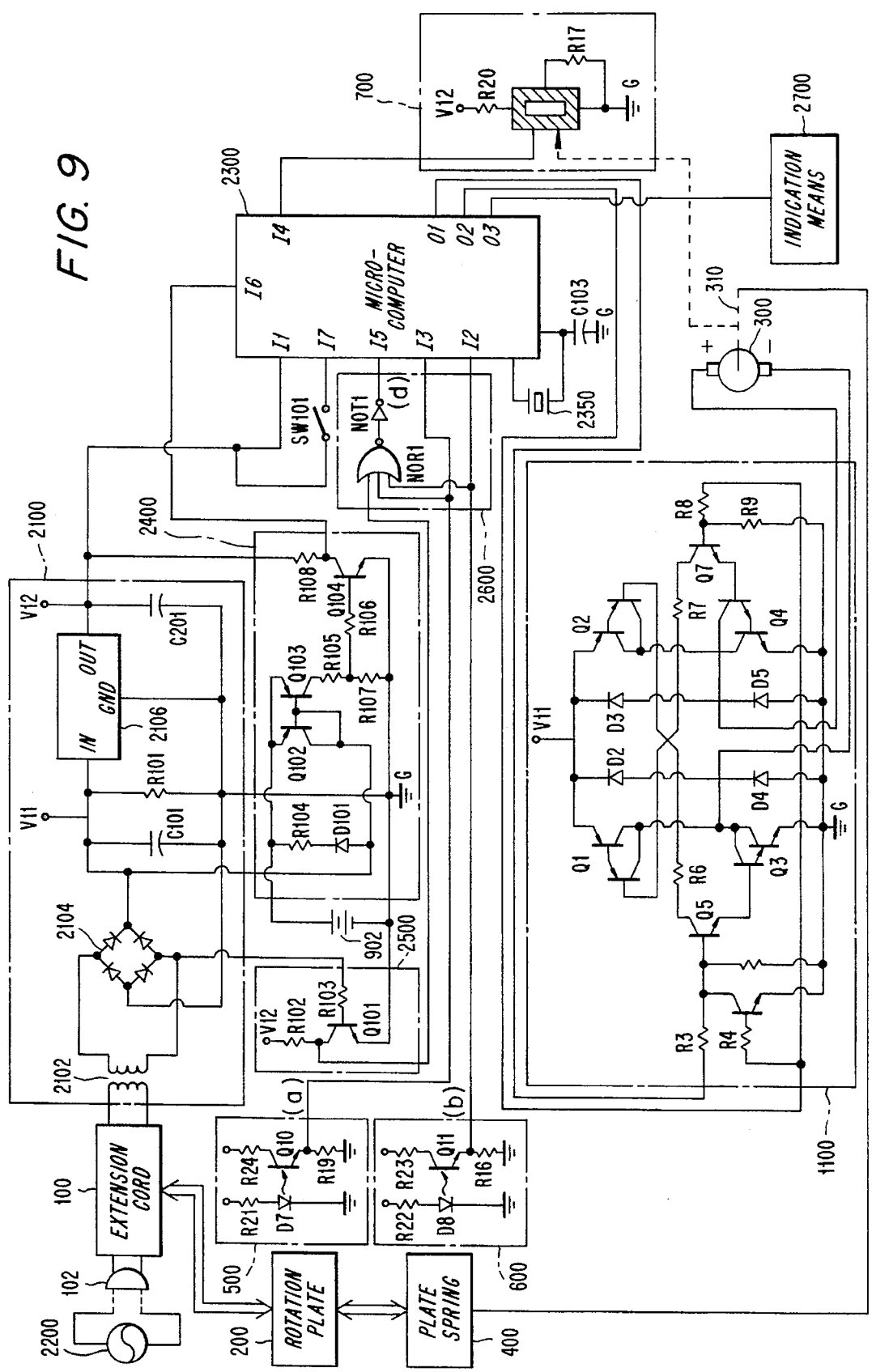
FIG. 9 is a detail view of FIG. 8.
Figure 10:
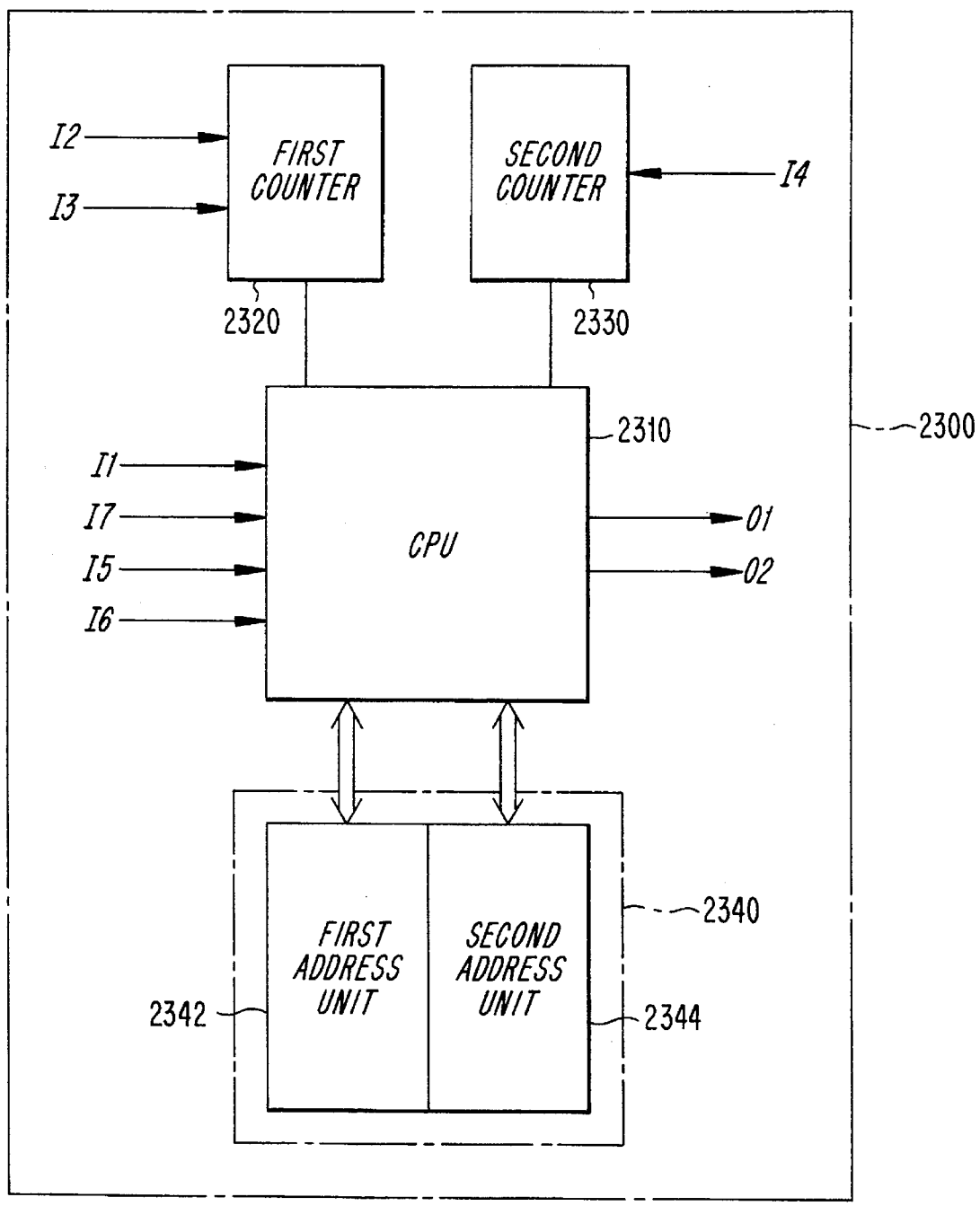
FIG. 10 is a constructional drawing of a microcomputer as illustrated in FIGS. 8 and 9.

In FIGS. 8, 9 and 10, the same portions as illustrated in FIGS. 1, 2 and 3 according to the first embodiment relating to the extracting apparatus for the power supply cord in a robot will be allocated with the same reference symbols, and overlapped explanations will be deleted.

A power supply circuit 2100 receives one of two voltage which are 220 V AC voltage outputted from an external power source 2200 and 12 V DC voltage outputted form the battery 902, and connected to the extension cord 100 in order to output a first DC voltage (V11) and a second DC voltage (V12).

The battery 902 is connected to the power supply circuit 2100 to thereby be charged by the external power source 2200.

A microcomputer 2300 is connected to the power supply circuit 2100 in order to control an overall operation of respective robots during the wakeup mode for normally consuming the power by way of receipt of the second DC voltage (V12) from the power supply circuit 2100 and during a standby mode for minimally consuming the power.

An oscillator 2350 is connected to the microcomputer 2300 in order to supply a predetermined clock to the microcomputer 2300, and one end of the oscillator 2350 is grounded through a condenser C103.

A standby mode signal supply circuit 2400 outputs a standby mode signal of high level to the microcomputer 2300 lest the external power 2200 should be supplied to the power supply circuit 2100 through the cord 100, so that the extracted extension cord 100 can be completely led into the body, and in order for the microcomputer 2300 to enter the standby mode for maintaining a minimal power, the standby mode signal supply circuit 2400 is connected to the power supply circuit 2100, battery 902 and the microcomputer 2300.

An external power supply detecting circuit 2500 is connected to the power supply circuit 2100 and a signal transfer circuit 2600 (explained later) in order to output to the microcomputer 2300 a signal heralding that the external power 2200 is supplied to the power supply circuit 2100 through the cord 100.

The signal transfer circuit 2600 is connected to the external power supply detecting circuit 2500, the first light sensor 500, the second light sensor 600 and the microcomputer 2300 in order to transfer to the microcomputer 2300 a signal outputted from the external power supply detecting circuit 2500, the first light sensor 500 and the second light sensor.

An indication means 2700 receives an indication signal outputted from the microcomputer 2300 to thereby be disposed on a surface of the body in order to indicate the extracted length of the cord 100, and the indication means 2700 is composed of a liquid crystal display panel.

Meanwhile, as illustrated in FIG. 9, the power supply circuit 2100 comprises: a transformer 2102 for transforming voltage inputted from the outside; a bridge diode 2104 for transforming the AC voltage outputted from the transformer 2102 to a first 12 V DC voltage (V11) to thereafter output the same; and a voltage regulator for regulating the first DC voltage outputted from the bridge diode 2104 to a second SV DC voltage (V12) which is less than the first DC voltage (V11).

The standby mode signal supply circuit 2400 comprises: a diode D101 and a resistor R104 for charging the battery 902 by supplying to the battery 902 the first DC voltage (V11) outputted from the bridge diode 2104 of the power supply circuit 2100 when the external power 2200 is supplied to the power supply circuit 2100 through the cord 100; a transistor Q102 for being reudered conductive when the external power 2200 is not supplied to the power supply circuit 2200 through the cord 100, with a collector terminal and a base terminal being commonly connected to an output terminal of the fridge diode 2104, while an emitter terminal being connected to an output terminal of the voltage regulator 2106, to thereby supply an output voltage of the battery 902 to an output terminal of the bridge diode 2104; a transistor Q103 for being reudered conductive when the external power 2200 is not supplied to the power supply circuit 2100 through the cord 100 while an emitter terminal is connected to an positive(+) output terminal of the battery 902, base terminal is connected to an output terminal of the bridge diode 2104 and a collector terminal is grounded G through a resistor R105 and a resistor R107; and a transistor for being reudered conductive to thereby output a standby of high level to the microcomputer 2300 when the external power 2200 is not supplied to the power supply circuit 2100 through the cord 100, while a base terminal is connected to a collector terminal of the transistor Q103 through a resistor R106 and a resistor R105, a collector terminal is connected to the ground terminal G and an emitter terminal is connected to an output terminal of the voltage regulator 2106 through a resistor R108.

The external power supply detecting circuit 2500 comprises a transistor Q101 for outputting to the microcomputer 2300 a pulse signal having the same frequency as the AC voltage of the external power 2200 when the AC voltage outputted from a transformer 2102 of the power supply circuit 2100 is received at a base terminal through a resistor R103, and the second DC voltage(V2) outputted from a voltage regulator 2106 of the power supply circuit 2100 is received through a resistor R102 to thereby cause the external power 2200 to be supplied to the power supply circuit 2100 through the cord.

The signal transfer circuit 2600 comprises: a NOR gate NOR1 for receiving output signals from the external power supply detecting circuit 2500, the first light sensor 500 and the second light sensor 600; and NOT gate NOT for reversing the output signal of the NOR gate NOR1 to thereby output the same to an inputer terminal 15 of the microcomputer 2300.

Meanwhile, a work finish switch SW101 is connected to the input terminal of the microcomputer 2300 in order to input a work finish signal to the microcomputer 2300.

The microcomputer 2300, as illustrated in FIG. 10, comprises: a central processing unit CPU 2310; a first counter 2320 for receiving a revolution signal indicative of an extracted length of the cord 100 from the first light sensor 500 and the second light sensor 600 to thereby count the revolution signal, a second counter 2330 for receiving a revolution signal indicative of the revolution of the motor 300 from the Hall sensor 700 to count the revolution signal thereof and to output the same to the CPU 2310; and a random access memory RAM, 2340 for receiving the count signal outputted from the CPU 2310 for storage and for outputting in turn the stored count signal to the CPU 2310.

Furthermore, the random access memory 2340 comprises; a first address unit 2342 for storing a count value indicative of a total length of the extracted cord 100; and a second address unit 2344 for storing an increases portion COUNT of the count value.

An operational effect of the extracting apparatus for the cord in a robot according to another embodiment of the present invention will be described in the following with reference to FIGS. 11 and 12.

In FIG. 11, reference symbol 12 denotes step STEP.

In an initial state, the first address unit 2342 of the random access memory 2340 in the microcomputer 2300 is stored with a count value (COUNT=0) indicative of an extracted length of the cord 100, step S 1010.

Next, when the user extracts the cord 100 from the body, the rotation plate 200 is rotated clockwise, and the first and second light sensors 500 and 600 are rendered conductive in that order to cause the wake-up mode signal to be inputted to the input terminal of the microcomputer 2300 with the help of the NOR gate NOR 1 and the NOT gate NOT 1.

Next, at step S 1020, an ambient environment of the microcomputer 2300 is discriminated as to whether it is the wake-up mode.

As mentioned above, if it is discriminated that the ambient environment of the microcomputer 2300 is the wake-up mode after the wake-up mode is received to the input terminal 15 of the microcomputer 2300 enter to the wake-up mode, Step S 1030, and then, the count value COUNT stored in the first address unit 2342 of the random access memory 2340 in the microcomputer 2300 is increased by one whenever the level of revolution signal outputted from the first light sensor 500 is decreased from light level to low level, and at the same time, a right direction signal (clockwise)is outputted from the output terminal 01 of the microcomputer 2300 and an operation of outputting a reverse direction signal (counterclockwise) from the output terminal 02 of the microcomputer 2300 is repeated, so that the tension can be adjusted in order to have the initially established tension applied to the cord 100, step S 1040.

The adjusting operation thereof has been described in the first embodiment of the present invention, so it will be deleted from the present embodiment in order to simplify the contents.

Next, an indication signal corresponding to the count value COUNT stored in the first address unit 2342 of the random access memory 2340 is outputted from an output terminal 03 of the microcomputer 2300 to the indication means 2700, so that the indication means 2700 can indicate to the outside of the body the extracted length of the cord 100.

Next, at time T1, when an electric plug 102 of the cord 100 is inserted into the outlet to thereby cause the external power 2200 to be supplied to the power supply circuit 2100, an AC voltage (+12) is outputted from the transformer 2102, and the AC voltage is inputted to a base terminal of the transistor Q101 and to a bridge diode 2104.

Next, the transformer 2102 is rendered conductive, so that a pulse waveform of ligh level having the same frequency as the 220 V AC voltage of the external power 2200 is outputted to an input terminal 15 of the microcomputer from a collector terminal of transistor Q101, as illustrated in FIG. 12C.

Therefore, the microcomputer 2300 discriminates that the ambient environment thereof is still the wake-up mode state and operates in the wake-up mode.

Furthermore, a first 12 V DC voltage (V11) is outputted from an output terminal of the bridge diode 2104 and the first DC voltage(V11) is applied to bases of the transistors Q102 and Q103 respectively to thereby render the transistors Q102 and Q103 inoperable so that the battery 902 can be charged by being inputted to a (+)positive terminal of the battery 902 with the help of the diode D1 and the resistor R4.

Next, when the user turns the work finish Switch SW101 on, an operation signal is inputted to an input terminal 17 of the microcomputer 2300, so that the microcomputer 2300 can start control for performing an established work (by way of example, mobile monitoring work).

When, the body is moved by the control of the microcomputer 2300, there occurs a change of tension offecting the cord 100.

At this time, the microcomputer 2300, first of all, discriminates whether there is any change in the level of revolution signal inputted from the first light sensor 500 to an input terminal of the microcomputer 2300, step S 1050, and if it is discriminated that there is a change of level in the revolution signal inputted from the first light sensor at step S1050 (in the case of "yes"), flow advances to step S 1060, and discriminates whether the level of revolution signal inputted from the first light sensor the the microcomputer 2300 has increased to high level from low level.

As a result of the discrimination, if it is discriminated that the level of the revolution signal has decreased to low level from high level, (in the case of "no"), flow proceeds to step S 1070, and discriminates whether the level of revolution signal inputted from an output terminal of the second light sensor to the input terminal 12 of the microcomputer 2300 is high level.

As a result of the discrimination, if it is discriminated that the level of the revolution signal is high level (in the case of "yes"), the microcomputer 2300 discriminates that the body is progressing toward a direction distancing itself from the outlet and the cord 100 is extracted, and increases the count value COUNT of the cord 100 stored in the first address unit 2342 in the random access memory 2340 by one whenever the level of revolution signal inputted from the first light sensor 500 decreases from high level to low level, step S 1080.

Next, the microcomputer 2300 calculates how much more the count value has increased than the count value corresponding the the initial tension to thereby get an increased count value, and stores the increased count value in the second address unit 2344 of the random access memory 2340, and at the same time, a right direction rotation command signal is outputted from the output terminal o1 of the microcomputer 2300.

According to the right direction rotation command signal, the transistor Q7, Darlington circuit Q3 and Darlington circuit Q2 in the motor driving circuit 1100 are rendered conductive in that order, so that the motor 300 rotates in the right direction by way of application of right direction driving voltage to the motor 300.

When the motor 300 rotates in the right direction, an inner end of plate spring 400 coupled with the rotation shaft 310 of the motor 300 rotates to the right direction to thereby release the wound plate spring 400, so that the tension strongly affecting the extension cord 100 is decreased to a normal state, step S 1090.

At the same time, the revolution signal of the motor 300 is inputted to an input terminal 14 of the microcomputer 2300 from the Hall sensor 700 disposed around end portion of the rotation shaft 310 in the motor 300, and the microcomputer 2300 compares a pulse number inputted in the input terminal 14 with the increased count value stored in the second address unit 2344 of the random access memory 2340 and discriminates whether the motor has rotated as much as the extracted length the cord 100 where the plate spring 400 can be released, step S 1100.

As a result of the discrimination, if the motor 300 has rotated as much as the increased count value (COUNT), (in the case of "yes"), the microcomputer 2300 keeps performing tension keeping control against the cord 100.

Meanwhile, when work is done on the body, the user turns off the work finish switch SW1, thereby inputting the work finish signal of low level from the work finish switch SW1 to an input terminal 17 of the microcomputer 2300.

Next, at time T6, when the user extracts the cord 100 from the outlet, the external power 2200 is not supplied to the power supply circuit 2100 through the cord 100.

Therefore, the potential level of output terminal of the transformer turns to a low level, and the transistor Q101 of the external power supply detecting circuit 2500 is rendered inoperable to thereby cause a signal of low level to be outputted from the transistor Q101.

At the same time, the level of the output terminal in the bridge diode 2104 turns to low level and the base terminal of the transistor Q102 in the standby mode signal supply circuit 2400 and the base terminal of the transistor Q3 become low level, to thereby canse the transistors Q102 and Q103 to be rendered conductive by way of output voltage of the battery 902 applied to the collector terminals.

When the transistor Q102 is rendered conductive, an output voltage of the battery 902 is applied to an output terminal of the bridge diode 2104 to thereby return the level of output terminal in the bridge diode 2104 to the first DC voltage V11, which in turn is applied to a power terminal of the motor driving circuit 1100 and an input terminal of the voltage regulator 2106.

Next, the second DC voltage V12 is outputted from an output terminal of the voltage regulator 2106 and the second DC voltage V12 is applied respectively to one end terminal of a resistor R21 and one end terminal of a resistor R24 in the first light sensor 500, and to one end terminal of a resistor R22 and one end terminal of a resistor R23 in the second light sensor 600.

Meanwhile, when the transistor R3 in the standby mode signal supply circuit 2400 is rendered conductive, the first DC voltage which is an output voltage of the battery 902 causes the standby mode signal of high level (as illustrated in FIG. 12F) to be outputted from a collector terminal of the transistor Q104 to an input terminal 16 of the microcomputer 2300 via resistors R105 and R6.

Accordingly, in this case at step S1020, the microcomputer 2300 judges that the ambient environment of the microcomputer 2300 is not the wake-up mode (discriminated as No), and flow advances to step S 1110.

The microcomputer 2300 discriminates at step S 1110 whether the ambient environment thereof is the standby mode, and because the standby mode signal of high level is inputted into an input terminal 16 of the microcomputer 2300, the microcomputer 2300 discriminates that the ambient environment thereof is in a standby mode, (discriminated as "yes").

Next, the microcomputer 2300 moves the count value stored in the first address unit 2342 of the random access memory 2340 to the second address unit 2344 for storage in order to lead completely the extension cord 100 into the body.

Next, a reverse rotation command signal having pulse number corresponding to the count value stored in the second address unit 2344 is outputted from the output terminal 02 of the microcomputer 2300 to the motor driving circuit 1100.

The transistor Q7, Darlington circuit Q4 and Darlington circuit Q1 of the motor driving circuit 1100 are rendered conductive in that order by the reverse rotation command signal, so that a reverse driving voltage is supplied to the motor 300 from an output terminal of the bridge diode 2104 to thereby rotate the motor 300 reversely (counterclockwise).

When the motor 300 rotates reversely, the inner end of the plate spring coupled with the rotation shaft 310 of the motor 300 is rotated reversely to thereby wind up the plate spring 400, so that a strong tension force is generated on the cord 100 and the extension cord 100 is led into the body, step S 1120.

At the same time, the revolution signal of the motor 300 is inputted to an input terminal 14 of the microcomputer from the Hall sensor 700 disposed around the tip end of the rotation shaft 310 in the motor 300, and the revolution signal is counted by the second counter 2330, and the counted value is inputted to the central processing unit 2310.

Next, the central processing unit 2310 decreases the count value stored in the second address unit 2344 of the random access memory 2340 as much as the count value inputted from the second counter 2330, step S 1130.

Flow advances to step S 1140 and the microcomputer 2300 discriminates whether the count value stored in the second address unit 2344 is "O", and if the count value is "O" (in the case of "yes"), that means that the cord 100 is completely led into the body, so flow proceeds to step S 1150.

At step S 1150, the microcomputer 2300 advances to a standby mode where power consumption of the robot, including the extracting apparatus of the cord, is minimally maintained.

Meanwhile, if the microcomputer at step S 1140 discriminates that the count value stored in the second address unit 2344 of the random access memory 2340 is not "O", (in the case of "no"), flow proceeds to step S 1120, repeats the aforesaid operations and rotates the motor 300 reversely until the count value stored in the second address unit 2344 of the random access memory 2340 reaches "O".

Meanwhile, if the microcomputer 2300 at step S 1060 discriminates that the level of revolution signal inputted from an input terminal 13 of the microcomputer 2300 has increased from low level to a high level (in the case of "yes"), flow advances to step S 1160, and at this time, if the level of revolution signal inputted from an output terminal of the second light sensor to the microcomputer is high level (in the case of "yes"), the microcomputer 2300 discriminates that the cord 100 is led into the body by the elasticity of the plate spring 400 because the distance between the body and the outlet has been reduced, whereas the pulse outputted from the second light sensor 600 advances ahead of the pulse outputted from the first light sensor to thereby rotate the rotation plate 200 reversely (counterclockwise). The microcomputer decreases by one the count value against the extracted length of the cord stored in the first address unit 2342 of the random access memory 2340 whenever the level of the revolution signal inputted from the first light sensor 500 decreases from high level to low level, step S 1170.

Next, a count more decreased than the count value corresponding to the initial tension is calculated to thereby be stored in the second address unit 2344 of the random access memory 2340 and at the same time, a reverse rotation command signal is outputted from the output terminal 02 of the microcomputer 2300.

The transistor Q7, Darlington circuit Q4 and Darlington circuit Q1 in the motor driving circuit 1100 are rendered conductive in that order by the reverse rotation command signal, so that the reverse driving voltage is applied to the motor 300 and the motor 300 rotates in the reverse direction.

If the motor 300 rotates reversely, the inner end of the plate spring 400 coupled with the rotation shaft 310 of the motor 300 rotates in the reverse (counterclockwise) direction to thereby wind up the loosened plate spring 400, and the loose tension applied to the cord 100 returns to the normal state (initial tension state), step S 1180.

At the same time, the revolution signal of the motor 300 is inputted to the input terminal of the microcomputer 2300 from the Hall sensor 700 disposed around the end tip portion of the rotation shaft 310 in the motor 300, and the microcomputer 2300 compares the pulse number inputted in the input terminal 14 with the decreased count value stored in the second address unit 2344 of the random access memory 2340 and discriminates whether the plate spring 400 has been rotated so as to wind up the extension cord 100.

As a result, if the motor 300 has been rotated (in the case of "yes") as much as the decreased count value, the microcomputer 2300 keeps performing the tension keeping control against the cord 100.

Meanwhile, if it is discriminated that the motor 300 has not been rotated as much as the decreased count value (in the case of "no"), flow proceeds to step S 1180, and the microcomputer 2300 keeps rotating reversely the motor 300 as much as the decreased count value.

Meanwhile, if it is discriminated that the motor 300 at step S 1100 has not been rotated as much as the increased count value, (in the case of "no"), flow proceeds to step S 1090, ad the microcomputer 2300 keep rotating the motor 300 in the right direction as much as the increased count value.

At the aforesaid step S 1050 if it is discriminated that there is no change in the level of revolution signal inputted to the input terminal 13 of the microcomputer 2300 from the first light sensor 500 (in the case of "no"), the microcomputer 2300 finishes a program of extracting and withdrawing control method on the cord.

At the aforementioned steps S 1070 and S 1160, the microcomputer 2300 discriminates that the level of revolution signal inputted from the output terminal of the second light sensor 600 to the input terminal of the microcomputer 2300 is not high level (in the case of "no"), the microcomputer 2300 finishes the program of extracting and withdrawing control method on the cord 100.

As seen from the foregoing, in accordance with the extracting apparatus and tension-keeping method of cord in a robot according to another embodiment of the present invention, when the the user extracts the electric plug 102 from the outlet after the work of the robot is finished the cord 100 is withdrawn automatically into the body, so that there is an outstanding effect of convenience in using.

Furthermore, the microcomputer always monitors ambient environment at the standby mode, so even if there occurs an emergency around the ambience of the body where an external power is not supplied to the body, the microcomputer 2300 changes the mode into a wake-up mode immediately to thereby cope with the emergency easily.

Even if the external power 2200 supplied to the body is cut off by the extension cord 100 pulled out of the outlet caused by a trip-over and the like during the course of established work, an alternative power is supplied by the internally chargeable battery 902 to thereby pickup the loose end.

Accordingly, an emergency caused by an inertia of the body resulting from a cut-off of the external power 2200 can be prevented.

Furthermore, in accordance with the extracting apparatus and tension-keeping method of cord in a robot according to another embodiment of the present invention, the distance between the robot body and the outlet can be easily recognized by the user.

When the work is done or external power supply is cut off during the course of work, the cord 100 is automatically led into the body by the power of the battery 902, so that conventional inconvenience where the user has to walk to to the body, pull off the electric plug 102 disposed at the end of the cord 100 and press the button disposed at the body is finally eliminated, to thereby achieve an outstanding effect.

As seen from the foregoing, according to the present invention relating to the extracting apparatus and tension-keeping method for the cord in a robot, the tension change of the cord occurring in accordance with the movement of the body of the robot is detected by a light sensor disposed around a rotation plate wound by the cord, and the detected change is compensated by rotation of the motor, so that a predetermined tension is always maintained on the cord regardless of the distance between the body and the outlet so that the travel of the robot is smoothly realized and as a result thereof, work on a region of space is performed with an excellent effect.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A self-propelled member, comprising:

a body;

a spool mounted on said body for rotation;

an electric power cord wound on said spool for extension and retraction in response to rotation of said spool in respective directions;

a spring connected to said spool biasing said spool for rotation in a direction for retracting said cord;

sensor means for sensing whether said cord is being extended or retracted and the extent of such extension or retraction;

motor means connected to said spring and operated by said sensor for displacing said spring in a spring-tightening direction and a spring-relaxing direction in response to retraction and extension, respectively, of said cord by an amount proportional to the sensed extent of cord extension or retraction for maintaining a generally constant tension on said cord; and a shaft arranged coaxially with respect to an axis of rotation of said spool, said spring comprising a spiral plate having an inner end affixed to said shaft and an outer end affixed to said spool, said motor connected to said shaft for rotating said shaft to relax or tighten said spring.

2. A method of maintaining a generally constant tension on an electric power supply cord of a self-propelled member, said cord being wound on a rotary spool, a spring connected to said spool for biasing said spool in a direction of rotation for retracting said cord, and a motor connected to said spring for tightening or loosening said spring, said method comprising the steps of:

A) sensing a direction of extension or retraction of said cord, and the extent of such extension or retraction; and B) activating said motor for displacing said spring in a spring-tightening direction and a spring-relaxing direction in response to retraction and extension, respectively, of said cord by an amount proportional to the sensed extent of cord extension or retraction for maintaining a generally constant tension on said cord.

3. The method according to claim 2, wherein step B comprises rotating an inner end of a spiral spring, an outer end of which is connected to said spool.

4. An apparatus for controlling a power supply cord of a robot, comprising:

a motor mounted on the robot and having an output shaft;

a spiral spring having radially inner and outer ends, the inner end fixed at to the motor output shaft;

a rotation spool to which the outer cord of the spring is fixed and on which the cord is wound; a power unit for receiving an alternating voltage through the cord to output a direct voltage when the cord is extracted from a body of the robot and inserted into a remote electrical outlet;

first and second light sensors for detecting a distance between the spool and the outlet when the body of the robot is initially moved and for outputting revolution signals;

a microcomputer for receiving the revolution signals outputted from the first and second light sensors to thereby output a motor rotation command signal which orders the motor to rotate by an amount corresponding to the revolution signal;

a motor driving circuit connected to the motor and the microcomputer for receiving the motor revolution command signal and rotating the motor output shaft in one of clockwise and counterclockwise directions;

a Hall sensor for detecting the number of revolutions of the motor output shaft and connected to the microcomputer for outputting that detected number to the microcomputer; and a lead power supply unit for supplying a direct current to the motor driving circuit when the cord is extracted from the electrical outlet.

5. The apparatus according to claim 4, wherein the spool is provided with protrusions around an external periphery thereof.

6. The apparatus according to claim 4, wherein the power unit comprises:

transformer means for varying magnitudes of alternating current voltages;

bridge diode means for transforming the alternating current voltage outputted from the transformer to direct current voltage (V1);

first voltage regulator means for receiving the direct current voltage (V1) outputted from the bridge diode and outputting a direct current voltage (V2) of 12 V; and second voltage regulator means for receiving direct current voltage (V2) of 12 V outputted from the first voltage regulator and outputting a direct current voltage (V4) of 5 V.

7. The apparatus according to claim 4, wherein the motor driving circuit comprises:

transistor means (Q5) connected at a base terminal to the microcomputer to thereby be turned on by a right turn direction signal transmitted from the microcomputer;

Darlington circuit means (Q3) connected at a base transistor (Q5) to be turned on by an application of voltage at the base from the transistor (Q5);

Darlington circuit means (Q2) connected at a base via a resistor (R6) to a collector terminal of the transistor Q6 to be turned on and apply a right turn direction driving voltage to the motor when the transistor (Q5) and the Darlington circuit (Q3) are activated;

transistor means (Q7) connected at a base to the microcomputer for being turned on by a reverse signal transmitted from the microcomputer;

Darlington circuit means (Q4) connected at a base to an emitter terminal of the transistor (Q7) to activate the transistor (Q7) and for being turned on by application of voltage to the base from the transistor (Q7);

a Darlington circuit (Q1) connected at a base to a collector terminal of the transistor (Q7) via a resistor (R7) to be activated when the transistor (Q7) and the Darlington circuit (Q4) are turned on and for applying a reverse direction driving voltage to the motor; and a transistor (Q6) for receiving a reverse direction signal from the microcomputer to be turned on and for turning a potential level of a base terminal at the transistor Q5 to low level.

8. The apparatus according to claim 4, wherein the lead power supply unit comprises:

a battery for being charged by the direct current voltage outputted from the bridge diode of the power supply;

a first switch for being turned on by actuation of a lead button to apply a positive (+) voltage of the battery to a base of the turn-on transistor Q7 in the motor driving circuit;

a transistor (Q9) connected to a positive (+) terminal of the battery through a resistor (R14) and a second switch (SW2) to be turned on by the positive voltage (+) of the battery when a lead button is pressed by a user; a transistor (Q10) connected to a base at a collector terminal of the transistor (Q9) through a resistor (R13) and for being turned on by an emitter at a positive (+) terminal of the battery when the transistor (Q9) is activated, to drive the motor in the reverse direction by way of the positive (+) voltage of the battery; and a transistor (Q5) for transforming a potential level of the transistor (Q9) to low level when the direct current voltage (V1) is supplied in order to prevent discharge of the battery.

9. A method for controlling the tension on an extension cord of a self-propelled robot, comprising the steps of:

A) extracting the extension cord by unwinding it from a rotary spool on which the cord is wound;

B) inserting a plug end of the cord into a remote electrical outlet;

C) rotating the spool in a first direction for drawing-in the cord;

D) determining whether a rate of rotation of the spool is within a predetermined range during step C;

E) rotating the spool a predetermined number of revolutions in a second direction for relaxing the tension on the cord when it is learned from step D that the rate of retraction of the spool is in the predetermined range;

F) initiating travel of the robot;

G) determining whether the cord is being extracted and counting the number of revolutions of the spool; and H) rotating an inner end of a spiral spring whose outer end is fixed to the spool, to cause the tension applied by the spring to the spool to be reduced when it is determined from step G that the cord is being extracted.

10. A method for controlling the tension on an extension cord of a self-propelled robot, comprising the steps of:

A) extracting the extension cord by unwinding it from a rotary spool on which the cord is wound;

B) inserting a plug end of the cord into a remote electrical outlet;

C) rotating the spool in a first direction for drawing-in the cord;

D) determining whether a rate of rotation of the spool is within a predetermined range during step C;

E) rotating the spool a predetermined number of revolutions in a second direction for relaxing the tension on the cord when it is learned from step D that the rate of retraction of the spool is in the predetermined range;

F) initiating travel of the robot;

G) determining whether the spool is being rotated in a cord-retracting direction by a spiral spring whose outer end is fixed to the spool and whose inner end is connected to a motor output shaft; and H) rotating the inner end of the spring in a direction causing a tension applied by the spring to the spool to be increased when it is determined from step G that the cord is being retracted.

* * * * *